United States Patent
Sang et al.

(10) Patent No.: US 11,582,714 B2
(45) Date of Patent: Feb. 14, 2023

(54) SYSTEM AND METHOD FOR HIERARCHICAL PAGING, CELL SELECTION AND CELL RESELECTION

(71) Applicant: Huawei Technologies Co., Ltd., Shenzhen (CN)

(72) Inventors: Aimin Justin Sang, Mountain View, CA (US); Mazin Ali Al-Shalash, Frisco, TX (US); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 17/009,589

(22) Filed: Sep. 1, 2020

(65) Prior Publication Data
US 2020/0404620 A1   Dec. 24, 2020

Related U.S. Application Data

(63) Continuation of application No. PCT/US2019/020439, filed on Mar. 1, 2019.
(Continued)

(51) Int. Cl.
H04W 68/00 (2009.01)
H04W 68/06 (2009.01)
H04W 24/10 (2009.01)

(52) U.S. Cl.
CPC ........... *H04W 68/06* (2013.01); *H04W 24/10* (2013.01)

(58) Field of Classification Search
CPC ... H04W 68/06; H04W 24/10; H04W 84/045; H04W 64/00; H04W 68/02; H04W 24/08;
(Continued)

(56) References Cited

U.S. PATENT DOCUMENTS

| | | | | |
|---|---|---|---|---|
| 5,915,214 A | * | 6/1999 | Reece | H04M 15/49 455/406 |
| 9,369,962 B2 | * | 6/2016 | Mohseni | H04W 52/0245 |

(Continued)

FOREIGN PATENT DOCUMENTS

| | | |
|---|---|---|
| CN | 105409307 A | 3/2016 |
| CN | 106465259 A | 2/2017 |

OTHER PUBLICATIONS

Wu, et al., "A Low-Cost, Low-Delay Location Update/Paging Scheme in Hierarchical Cellular Networks", Sep. 19, 2003, 6 pages, San Diego, California.
(Continued)

*Primary Examiner* — Stephen M D Agosta
(74) *Attorney, Agent, or Firm* — Slater Matsil, LLP

(57) ABSTRACT

In one embodiment, a policy may be defined, which specifies that an operation be performed over a first set of channels before being performed over a second set of channels different than the first set of channels. The first set of channels may be associated with a first set of frequencies, and the second set of channels may be associated with a second set of frequencies. A network device may perform paging according to the defined policy. A user equipment (UE) may perform paging, page monitoring, cell selection triggered by paging, or cell reselection triggered by paging according to the policy. The policy may be hardcoded, pre-configured or dynamically configured using signaling messages.

14 Claims, 12 Drawing Sheets

Related U.S. Application Data

(60) Provisional application No. 62/637,928, filed on Mar. 2, 2018.

(58) Field of Classification Search
CPC . H04L 63/101; H04L 61/1511; H04L 61/303; H04M 1/724; H04M 1/7243; H04M 1/72412; H04M 1/72415; H04J 3/10; H04J 13/0048; H04J 14/02; H04J 11/0069
See application file for complete search history.

(56) References Cited

U.S. PATENT DOCUMENTS

| | | | |
|---|---|---|---|
| 9,485,664 B2 | 11/2016 | Jha et al. | |
| 9,883,480 B2 * | 1/2018 | Tabet | H04W 72/042 |
| 9,930,637 B2 * | 3/2018 | Sebire | H04W 68/02 |
| 10,499,326 B2 * | 12/2019 | Qi | H04W 28/0284 |
| 10,506,549 B2 * | 12/2019 | Li | H04W 68/02 |
| 10,517,067 B2 * | 12/2019 | Islam | H04W 72/042 |
| 10,524,228 B2 * | 12/2019 | Agiwal | H04B 7/088 |
| 10,694,495 B2 * | 6/2020 | Vaidya | H04W 16/14 |
| 10,736,076 B2 * | 8/2020 | Radulescu | H04W 68/00 |
| 10,764,864 B2 * | 9/2020 | Vaidya | H04W 72/1231 |
| 2007/0105568 A1 * | 5/2007 | Nylander | H04W 12/08 |
| | | | 455/458 |
| 2008/0130585 A1 * | 6/2008 | Park | H04W 36/00835 |
| | | | 370/332 |
| 2009/0098890 A1 * | 4/2009 | Vasudevan | H04W 68/06 |
| | | | 455/458 |
| 2010/0034160 A1 | 2/2010 | Prakash et al. | |
| 2010/0112982 A1 * | 5/2010 | Singh | H04L 63/101 |
| | | | 455/458 |
| 2010/0128694 A1 * | 5/2010 | Choi-Grogan | H04W 36/365 |
| | | | 455/436 |
| 2010/0128697 A1 * | 5/2010 | Choi-Grogan | H04W 36/0044 |
| | | | 370/332 |
| 2010/0323610 A1 * | 12/2010 | Li | H04W 68/02 |
| | | | 455/458 |
| 2011/0206012 A1 * | 8/2011 | Youn | 370/332 |
| 2011/0243053 A1 * | 10/2011 | Tinnakornsrisuphap | |
| | | | H04L 12/189 |
| | | | 370/312 |
| 2011/0256883 A1 * | 10/2011 | Park | H04W 4/029 |
| | | | 455/456.1 |
| 2012/0184273 A1 * | 7/2012 | Burgess | H04W 60/00 |
| | | | 455/435.1 |
| 2013/0225167 A1 * | 8/2013 | Tokgoz | H04W 16/14 |
| | | | 455/435.1 |
| 2014/0113590 A1 * | 4/2014 | Meylan | H04W 48/18 |
| | | | 455/411 |
| 2015/0031382 A1 | 1/2015 | Damnjanovic et al. | |
| 2017/0339675 A1 | 11/2017 | Liu et al. | |

OTHER PUBLICATIONS

Huawei, HiSilicon, "NR Paging Options", 3GPP TSG-RAN WG2 #101, R2-1803647, 10.4.5.6, Feb. 26-Mar. 2, 2018, 12 pages, Athens, Greece.

Huawei, HiSilicon et al., "NR Paging Options",3GPP TSG-RAN WG2 #101, R2-1803647, Feb. 26-Mar. 2, 2018, 11pages, Athens, Greece.

* cited by examiner

1300 → 1302: PAGE A USER EQUIPMENT (UE) USING A FIRST FREQUENCY IN A FIRST SET OF FREQUENCIES ACCORDING TO A POLICY, WHERE THE POLICY REQUIRES THAT PAGING BE PERFORMED IN THE FIRST SET OF FREQUENCIES BEFORE BEING PERFORMED IN A SECOND SET OF FREQUENCIES DIFFERENT THAN THE FIRST SET OF FREQUENCIES

FIG. 13

1400 → 1402: PERFORM, IN A FIRST SET OF FREQUENCIES ACCORDING TO A POLICY, AN OPERATION COMPRISING PAGING, PAGE MONITORING, CELL SELECTION TRIGGERED BY PAGING, OR CELL RESELECTION TRIGGERED BY PAGING, WHERE THE POLICY REQUIRES THAT THE OPERATION BE PERFORMED IN THE FIRST SET OF FREQUENCIES BEFORE BEING PERFORMED IN A SECOND SET OF FREQUENCIES DIFFERENT THAN THE FIRST SET OF FREQUENCIES

FIG. 14

1500 → 1502: PAGE A USER EQUIPMENT (UE) OVER A FIRST PAGING CHANNEL IN A FIRST SET OF CHANNELS ACCORDING TO A POLICY, WHERE THE POLICY REQUIRES THAT PAGING BE PERFORMED OVER THE FIRST SET OF CHANNELS BEFORE BEING PERFORMED OVER A SECOND SET OF CHANNELS DIFFERENT THAN THE FIRST SET OF CHANNELS

FIG. 15

1600 → 1602: PERFORM, OVER A FIRST SET OF CHANNELS ACCORDING TO A POLICY, AN OPERATION COMPRISING PAGING, PAGE MONITORING, CELL SELECTION TRIGGERED BY PAGING, OR CELL RESELECTION TRIGGERED BY PAGING, WHERE THE POLICY REQUIRES THAT THE OPERATION BE PERFORMED OVER THE FIRST SET OF CHANNELS BEFORE BEING PERFORMED OVER A SECOND SET OF CHANNELS DIFFERENT THAN THE FIRST SET OF FREQUENCIES

FIG. 16

SYSTEM AND METHOD FOR HIERARCHICAL PAGING, CELL SELECTION AND CELL RESELECTION

CROSS-REFERENCE TO RELATED APPLICATIONS

This application is a continuation application of International Application No. PCT/US19/20439, filed on Mar. 1, 2019, entitled "System and Method for Hierarchical Paging, Cell Selection and Cell Reselection", which claims the benefit of U.S. Provisional Application No. 62/637,928, filed on 2 Mar. 2018 and entitled "NR Hierarchical paging Scheme with Main Assistance". The afore-mentioned applications are hereby incorporated herein by reference in their entireties.

TECHNICAL FIELD

The present disclosure relates generally to a system and method for wireless communications, and, in particular embodiments, to a system and method for hierarchical paging, cell selection and cell reselection.

BACKGROUND

High carrier frequencies, such as frequencies of 6 GHz and above, have been introduced in the new generation wireless communications systems for achieving higher data rates to accommodate the increasingly heavier wireless traffic. Such wireless communications systems may suffer high path-loss, and beamforming is utilized in order to compensate the high path-loss and meet performance requirements. Communicating devices face challenges arising from the narrow width beams used in beamforming-based high frequency wireless communications, including high overhead, low mobility robustness, and high power consumption occurring in various operations, such as paging, page monitoring, cell selection and reselection, and mobility.

SUMMARY

According to one aspect of the present disclosure, a method is provided that includes: paging, by a network device, a user equipment (UE) using a first frequency in a first set of frequencies according to a policy, the policy requiring that paging be performed in the first set of frequencies before being performed in a second set of frequencies different than the first set of frequencies.

The policy facilitates paging of the UE by the network device in a hierarchical order of the first set of frequencies and the second set of frequencies. This further helps reduce overhead in signaling the hierarchical order when performing the paging, latency, and power consumption.

Optionally, in any of the preceding aspects, the first set of frequencies is lower than the second set of frequencies.

Optionally, in any of the preceding aspects, wireless communications using the first set of frequencies does not require beamforming, and wireless communications using the second set of frequencies requires beamforming.

Optionally, in any of the preceding aspects, the first set of frequencies corresponds to beam widths that are wider than those of the second set of frequencies.

Optionally, in any of the preceding aspects, the first set of frequencies is used by a master node (MN), and the second set of frequencies is used by one or more secondary nodes (SNs) that are associated with the MN.

Optionally, in any of the preceding aspects, one of the first set of frequencies and the second set of frequencies is in an unlicensed frequency band, and the other one of the first set of frequencies and the second set of frequencies is in a licensed frequency band.

Optionally, in any of the preceding aspects, the first set of frequencies has better channel quality than the second set of frequencies.

Optionally, in any of the preceding aspects, the first set of frequencies is associated with higher transmission power than the second set of frequencies.

Optionally, in any of the preceding aspects, transmission using the first set of frequencies provides greater coverage than the second set of frequencies.

Optionally, in any of the preceding aspects, the first set of frequencies corresponds to channels that are less loaded than the second set of frequencies.

Optionally, in any of the preceding aspects, the network device is a base station.

Optionally, in any of the preceding aspects, the network device is a master node.

Optionally, in any of the preceding aspects, the network device is a secondary node.

Optionally, in any of the preceding aspects, the network device is a part of a core network.

Optionally, in any of the preceding aspects, the method further comprises: determining, by the network device, a plurality of network devices that are configured to operate in the second set of frequencies; and instructing, by the network device, at least one of the plurality of network devices to page the UE using a frequency in the second set of frequencies according to the policy. This reduces the number of network devices that will be involved in paging the UE in the second set of frequencies.

Optionally, in any of the preceding aspects, the method further comprises transmitting, by the network device to the UE, information about the at least one of the plurality of network devices. Transmission of the information to the UE facilitates the UE to monitor, detect and respond to pages from and set up connection with the at least one of the plurality of network devices. This further reduces paging latencies and misses, power consumption and signaling overhead.

Optionally, in any of the preceding aspects, the information comprises location information, beam information, paging opportunity information, or synchronization information of the at least one of the plurality of network devices.

Optionally, in any of the preceding aspects, the method further comprises: transmitting, by the network device to the at least one of the plurality of network devices, information about the UE. Transmission of the information about the UE facilitates the at least one of the plurality of network devices to page the UE and set up connection with the UE.

Optionally, in any of the preceding aspects, determining, by the network device, the plurality of network devices comprises: determining, by the network device, the plurality of network devices based on a location, beam information, a channel quality measurement report or transmission power information of the UE.

Optionally, in any of the preceding aspects, the method further comprises: re-determining, by the network device, one of the plurality of network devices.

Optionally, in any of the preceding aspects, one of the plurality of network devices is re-determined based on a measurement report from the UE or network loading information.

Optionally, in any of the preceding aspects, the method further comprises: transmitting, by the network node, a secondary node addition request to the at least one of the plurality of network devices. The request facilitates the at least one of the plurality of network devices to participate paging of the UE in the second set of frequencies according to the policy.

Optionally, in any of the preceding aspects, the method further comprises: receiving, by the network node, a secondary node addition acknowledgement from the at least one of the plurality of network devices.

Optionally, in any of the preceding aspects, the method further comprises: receiving, by the network device, a paging response from the UE at the first frequency.

Optionally, in any of the preceding aspects, the method further comprises: receiving, by the network device, a paging response from one of the plurality of network devices operating in a second frequency of the second set of frequencies, the one of the plurality of network devices having received a paging response from the UE.

Optionally, in any of the preceding aspects, the method further comprises: paging, by the network device, the UE using a second frequency in the second set of frequencies after paging the UE using the first frequency.

Optionally, in any of the preceding aspects, the method further comprises: establishing, by the network device, a communication connection with the UE at the first frequency.

Optionally, in any of the preceding aspects, the method further comprises: receiving, by the network device, information of the policy from a core network device.

Optionally, in any of the preceding aspects, the method further comprises: receiving, by the network device, update information of the policy.

Optionally, in any of the preceding aspects, the policy is hardcoded at the network device, pre-configured with the network device, or dynamically configured with the network device using signaling messages.

According to another aspect of the present disclosure, a method is provided that includes: performing, by user equipment (UE) in a first set of frequencies according to a policy, an operation comprising paging, page monitoring, cell selection triggered by paging, or cell reselection triggered by paging, the policy requiring that the operation be performed in the first set of frequencies before being performed in a second set of frequencies different than the first set of frequencies.

The policy facilitates the UE to perform the operation in a hierarchical order of the first set of frequencies and the second set of frequencies. This further helps reduce overhead in signaling the hierarchical order for the UE to perform the operation, and reduce latency and power consumption for performing the operation.

Optionally, in any of the preceding aspects, the first set of frequencies is lower than the second set of frequencies.

Optionally, in any of the preceding aspects, the first set of frequencies is associated with higher transmission power than the second set of frequencies.

Optionally, in any of the preceding aspects, transmission using the first set of frequencies provides greater coverage than the second set of frequencies.

Optionally, in any of the preceding aspects, wireless communications using the first set of frequencies does not require beamforming, and wireless communications using the second set of frequencies requires beamforming.

Optionally, in any of the preceding aspects, the first set of frequencies corresponds to beam widths that are wider than those of the second set of frequencies.

Optionally, in any of the preceding aspects, the first set of frequencies is used by a master node (MN), and the second set of frequencies is used by one or more secondary nodes (SNs) of the MN.

Optionally, in any of the preceding aspects, one of the first set of frequencies and the second set of frequencies is in an unlicensed frequency band, and the other one of the first set of frequencies and the second set of frequencies is in a licensed frequency band.

Optionally, in any of the preceding aspects, the first set of frequencies has better channel quality than the second set of frequencies.

Optionally, in any of the preceding aspects, the first set of frequencies corresponds to channels that are less loaded than the second set of frequencies.

Optionally, in any of the preceding aspects, the method further comprises: performing, by the UE, the operation in the second set of frequencies after performing the operation in the first set of frequencies according to the policy.

Optionally, in any of the preceding aspects, performing the operation in the first set of frequencies comprises: monitoring, by the UE, a page at a first frequency of the first set of frequencies.

Optionally, in any of the preceding aspects, the method further comprises: monitoring, by the UE, a page at a second frequency of the second set of frequencies after monitoring the page at the first frequency according to the policy.

Optionally, in any of the preceding aspects, monitoring the page at the second frequency comprises: monitoring, by the UE, pages from a plurality of network devices, the plurality of network devices operable in the second set of frequencies.

Optionally, in any of the preceding aspects, performing the operation in the first set of frequencies comprises: scanning, by the UE after being paged, channels in the first set of frequencies during a cell selection or cell reselection process.

Optionally, in any of the preceding aspects, the method further comprises: scanning, by the UE, channels in the second set of frequencies during the cell selection process or cell reselection process after scanning the channels in the first set of frequencies.

Optionally, in any of the preceding aspects, scanning the channels in the second set of frequencies comprises: scanning, by the UE, channels extending between the UE and a plurality of network devices, the plurality of network devices operable in the second set of frequencies.

Optionally, in any of the preceding aspects, the plurality of network devices is determined based on a location, beam information, a channel quality measurement report, or transmission power information of the UE.

Optionally, in any of the preceding aspects, the method further comprises: receiving, by the UE, information about the plurality of network devices. Receiving the information facilitates the UE to monitor, detect and respond to pages from and set up connection with one of the plurality of network devices. This further reduces paging latencies and misses, power consumption and signaling overhead.

Optionally, in any of the preceding aspects, the method further comprises: establishing, by the UE, a communication connection with a network device at a second frequency in the second set of frequencies.

Optionally, in any of the preceding aspects, the method further comprises: receiving, by the UE, information about the policy.

Optionally, in any of the preceding aspects, the method further comprises: receiving, by the UE, updated information about the policy.

Optionally, in any of the preceding aspects, the UE is in a RRC_Idle state.

Optionally, in any of the preceding aspects, the UE is in a RRC_Inactive state.

Optionally, in any of the preceding aspects, the policy is hardcoded at the UE, pre-configured with the UE, or dynamically configured with the UE using signaling messages.

According to another aspect of the present disclosure, a method is provided that includes: paging, by a network device, a user equipment (UE) over a first paging channel in a first set of channels according to a policy, the policy requiring that paging be performed over the first set of channels before being performed over a second set of channels different than the first set of channels.

The policy facilitates paging of the UE by the network device in a hierarchical order of the first set of channels and the second set of channels. This further helps reduce overhead in signaling the hierarchical order when performing the paging, latency, and power consumption.

Optionally, in any of the preceding aspects, the first set of channels is associated with a master node and the second set of channels is associated with a secondary node, the secondary node being associated with the master node.

Optionally, in any of the preceding aspects, the first set of channels is associated with frequencies lower than frequencies associated with the second set of channels.

Optionally, in any of the preceding aspects, wireless communications over the first set of channels does not require beamforming, and wireless communications using the second set of channels requires beamforming.

Optionally, in any of the preceding aspects, the first set of channels corresponds to beam widths that are wider than those of the second set of channels.

Optionally, in any of the preceding aspects, one of the first set of channels and the second set of channels is associated with frequencies in an unlicensed frequency band, and the other one of the first set of channels and the second set of channels is associated with frequencies in a licensed frequency band.

Optionally, in any of the preceding aspects, the first set of channels has better channel quality than the second set of channels.

Optionally, in any of the preceding aspects, the first set of channels is associated with higher transmission power than the second set of channels.

Optionally, in any of the preceding aspects, transmission over the first set of channels provides greater coverage than the second set of channels.

Optionally, in any of the preceding aspects, the first set of channels experience less load than the second set of channels.

Optionally, in any of the preceding aspects, the method further comprises: determining, by the network device, a plurality of network devices that are configured to communicate over the second set of channels; and instructing, by the network device, at least one of the plurality of network devices to page the UE over a channel in the second set of channels according to the policy. This reduces the number of network devices that will be involved in paging the UE over the second set of channels.

Optionally, in any of the preceding aspects, the method further comprises: transmitting, by the network device to the UE, information about the at least one of the plurality of network devices. Transmission of the information to the UE facilitates the UE to monitor, detect and respond to pages from and set up connection with the at least one of the plurality of network devices. This further reduces paging latencies and misses, power consumption and signaling overhead.

Optionally, in any of the preceding aspects, the information comprises location information, beam information, paging opportunity information, or synchronization information of the at least one of the plurality of network devices.

Optionally, in any of the preceding aspects, the method further comprises: transmitting, by the network device to the at least one of the plurality of network devices, information about the UE. Transmission of the information about the UE facilitates the at least one of the plurality of network devices to page the UE and set up connection with the UE.

Optionally, in any of the preceding aspects, determining, by the network device, the plurality of network devices comprises: determining, by the network device, the plurality of network devices based on a location, beam information, a channel quality measurement report or transmission power information of the UE.

Optionally, in any of the preceding aspects, the method further comprises: re-determining, by the network device, one of the plurality of network devices.

Optionally, in any of the preceding aspects, one of the plurality of network devices is re-determined based on a measurement report from the UE or network loading information.

Optionally, in any of the preceding aspects, the method further comprises: transmitting, by the network node, a secondary node addition request to the at least one of the plurality of network devices. The request facilitates the at least the one of the plurality of network devices to participate paging of the UE over the second set of channels according to the policy.

Optionally, in any of the preceding aspects, the method further comprises: receiving, by the network device, a paging response from one of the plurality of network devices operating over a second channel of the second set of channels, the one of the plurality of network devices having received a paging response from the UE.

Optionally, in any of the preceding aspects, the method further comprises: paging, by the network device, the UE over a second channel in the second set of channels after paging the UE over the first channel.

Optionally, in any of the preceding aspects, the method further comprises: receiving, by the network device, information of the policy from a core network device.

Optionally, in any of the preceding aspects, the policy is hardcoded at the network device, pre-configured with the network device, or dynamically configured with the network device using signaling messages.

According to another aspect of the present disclosure, a method is provided that includes: performing, by user equipment (UE) over a first set of channels according to a policy, an operation comprising paging, page monitoring, cell selection triggered by paging, or cell reselection triggered by paging, the policy requiring that the operation be performed over the first set of channels before being performed over a second set of channels different than the first set of frequencies.

The policy facilitates the UE to perform the operation in a hierarchical order of the first set of channels and the second set of channels. This further helps reduce overhead in signaling the hierarchical order for the UE to perform the operation, and reduce latency and power consumption for performing the operation.

Optionally, in any of the preceding aspects, the first set of channels is associated with frequencies lower than that associated with the second set of channels.

Optionally, in any of the preceding aspects, the first set of channels is associated with higher transmission power than the second set of channels.

Optionally, in any of the preceding aspects, transmission over the first set of channels provides greater coverage than the second set of channels.

Optionally, in any of the preceding aspects, wireless communications over the first set of channels does not require beamforming, and wireless communications using the second set of channels requires beamforming.

Optionally, in any of the preceding aspects, the first set of channels corresponds to beam widths that are wider than those of the second set of channels.

Optionally, in any of the preceding aspects, the first set of channels is associated with a master node and the second set of channels is associated with a secondary node, the secondary node being associated with the master node.

Optionally, in any of the preceding aspects, one of the first set of channels and the second set of channels is associated with frequencies in an unlicensed frequency band, and the other one of the first set of channels and the second set of channels is associated with frequencies in a licensed frequency band.

Optionally, in any of the preceding aspects, the first set of channels has better channel quality than the second set of channels.

Optionally, in any of the preceding aspects, the first set of channels experience less load than the second set of channels.

Optionally, in any of the preceding aspects, the method further comprises: performing, by the UE, the operation over the second set of channels after performing the operation over the first set of channels according to the policy.

Optionally, in any of the preceding aspects, performing the operation over the first set of channels comprises: monitoring, by the UE, a page at one or more first frequencies associated with the first set of channels.

Optionally, in any of the preceding aspects, the method further comprises: monitoring, by the UE, a page at one or more second frequencies associated with the second set of channels after monitoring the page at the one or more first frequencies according to the policy.

Optionally, in any of the preceding aspects, monitoring the page at the one or more second frequencies comprises: monitoring, by the UE, pages from a plurality of network devices, the plurality of network devices operable in the one or more second frequencies associated with the second set of channels.

Optionally, in any of the preceding aspects, performing the operation over the first set of channels comprises: scanning, by the UE after being paged, a first channel of the first set of channels during a cell selection or cell reselection process.

Optionally, in any of the preceding aspects, the method further comprises: scanning, by the UE, a second channel of the second set of channels during the cell selection process or cell reselection process after scanning the first channel of the first set of channels.

Optionally, in any of the preceding aspects, scanning the second channel in the second set of channels comprises: scanning, by the UE, the second channel extending between the UE and a plurality of network devices, the plurality of network devices operable in the second channel.

Optionally, in any of the preceding aspects, the plurality of network devices is determined based on a location, beam information, a channel quality measurement report, or transmission power information of the UE.

Optionally, in any of the preceding aspects, the method further comprises: receiving, by the UE, information about the plurality of network devices. Receiving the information facilitates the UE to monitor, detect and respond to pages from and set up connection with one of the plurality of network devices. This further reduces paging latencies and misses, power consumption and signaling overhead.

Optionally, in any of the preceding aspects, the method further comprises: establishing, by the UE, a communication connection with a network device over a channel of the second set of channels.

Optionally, in any of the preceding aspects, the method further comprises: receiving, by the UE, information about the policy.

Optionally, in any of the preceding aspects, the method further comprises: receiving, by the UE, updated information about the policy.

Optionally, in any of the preceding aspects, the UE is in a RRC_Idle state.

Optionally, in any of the preceding aspects, the UE is in a RRC_Inactive state.

Optionally, in any of the preceding aspects, the policy is hardcoded at the UE, pre-configured with the UE, or dynamically configured with the UE using signaling messages.

According to another aspect of the present disclosure, an apparatus is provided that includes a non-transitory memory storage comprising instructions, and one or more processors in communication with the memory storage, wherein the one or more processors executes the instructions to: perform a method as recited in any of the preceding aspects.

According to another aspect of the present disclosure, a communications system comprising a network device, and a user equipment (UE), wherein the network device is configured to perform a method as recited in any of the preceding aspects in connection with a network device, and the UE is configured to perform a method as recited in any of the preceding aspects in connection with a UE.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 13 illustrates a diagram of an embodiment method for wireless communications;

FIG. 14 illustrates a diagram of another embodiment method for wireless communications;

FIG. 15 illustrates a diagram of another embodiment method for wireless communications;

FIG. 16 illustrates a diagram of another embodiment method for wireless communications;

DETAILED DESCRIPTION OF ILLUSTRATIVE EMBODIMENTS

Figure 1:
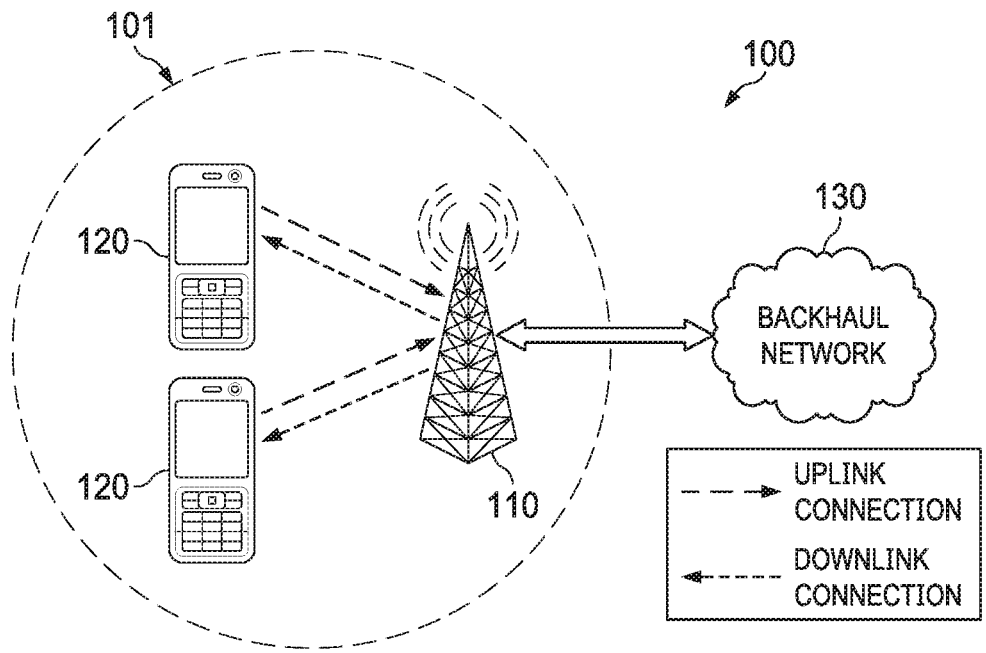
FIG. 1 illustrates a diagram of an embodiment wireless network.

The structure, manufacture and use of the presently preferred embodiments are discussed in detail below. It should be appreciated, however, that the present disclosure provides many applicable novel concepts that can be embodied in a wide variety of specific contexts. The specific embodiments discussed are merely illustrative of specific ways to make and use the embodiments, and do not limit the scope of the disclosure.

Conventional beam sweeping based new radio (NR) paging schemes generally involves large overhead in, e.g., beam sweeping, signaling and power consumption. A LF assisted HF paging approach may help improve paging efficiency, however, lacks a trigger mechanism to trigger utilization of LF assistance for HF paging.

Embodiments of the present disclosure provide a policy that is configured and executed for hierarchically performing various operations, such as paging, page monitoring, cell selection triggered by paging, or cell reselection triggered by paging. In one embodiment, a policy specifies or requires that one set of frequencies has an absolute higher priority than the other set of frequencies, and thus will be utilized in an operation before the other set. In another embodiment, a policy specifies or requires that one set of channels has an absolute higher priority than the other set of channels, and thus will be utilized in an operation before the other set. Various criteria may be used to determine which set of frequencies or channels has an absolute higher priority. For example, a set of frequencies may be assigned an absolute higher priority than the other set when the set of frequencies is less costly, corresponds to a wider beamwidth, or involves less overhead.

The policy may be applied to dual connectivity (DC), multi connectivity (MC), or carrier aggregation (CA) based communications systems. The policy may be predetermined (e.g., hardcoded), pre-configured, or dynamically configured and reconfigured (e.g., by signaling) for network devices, e.g., base stations, and user devices, e.g., UEs. Configuration and execution facilitates paging of a UE by a network device in a hierarchical order of different frequencies or channels, and facilitates a UE to perform the operations in a hierarchical order of the different frequencies or channels. This further helps reduce signaling overhead in the operations, operation latencies and power consumptions. Details will be provided in the following.

For the purposes of this application, the following list of acronyms is provided to aid in the understanding of the disclosure. As is known to someone skilled in the art, various acronyms may have a plurality of meaning, therefore the meaning of any acronym should be interpreted in view of the appropriate context of the disclosure.

BM: Beam Management, referring to any beam-specific operations, particularly beam alignment, beam refinement, beam tracking, and beam switching with respect to the same serving node, node family (TRP and its parent cell/gNB), or strictly synchronized nodes (multiple TRPs that are literally unable to be distinguished by UE from beam operations' perspective.)

MM: Mobility Management, referring to switching of serving nodes due to UE's mobility, and often incurring L2 (Layer 2) or L3 (Layer 3) signaling and even data transfer/split between the nodes and with the UE for the switch.

SA: Standalone (NR)

NSA: Non-Standalone (NR)

RRM: Radio Resource Management

BLER: Block Error Rate

CH: Channel

RLM: Radio Link Monitoring

RLF: Radio Link Failure

KPI: Key Performance Index

BFR: Beam (link) Failure Recovery

BRF: Beam (failure) Recovery Failure

TRP: Transmission And Reception Point (i.e., the unit of serving node inside yet at the edge of a network, talking to the UE over the air radio), typically referring to RRH with or without PHY or MAC NR: New Radio (i.e., 5G access)

5G: Fifth Generation

NGC: Next Generation Core (5G Core)

RAN: Radio Access Network (for LTE access)

MN: Master Node (e.g., a MgNB or MeNB in DC)

SN: Secondary Node (e.g., a SgNB or SeNB in DC)

CN: Core Network

EPC: Evolved Packet Core—4G Core Network

HF: High Frequency

LF: Low Frequency

MO/MT: mobile originated/mobile terminated gNB: next generation (5G) base station (compared to LTE base station eNB), which may include one CU (Central Unit) and one or more DUs (Distributed Units)

CU: central unit, normally hosting L3 RRC, PDCP protocol layers

DU: distributed unit, normally hosting RLC, and/or MAC, and/or PHY, etc.

UE: User Equipment, or user device

DCI in PDCCH: Downlink control Info in Physical Downlink Control Channel

DL/UL: Downlink/Uplink

UCI in PUCCH/PUSCH: Uplink Control info in Physical Uplink Control/Shared Channel RS: Reference Signal at L1 (could be UL uplink or DL downlink).

CE: control element

SR: Scheduling Request

CRS: cell specific RS at Li along DL (from the network to the UE)

PDCCH: Physical Downlink Control Channel

NextGen: Next Generation (CN)

L1/L3: Layer 1 or Layer 3 (normally referring to Physical layer or RRC layer, respectively)

L2: Layer 2

E-UTRAN: basically referring to 4G LTE radio access network or RAN

CA: Carrier Aggregation

MCG/SCG: Master Cell Group/Secondary Cell Group

HetNet: Heterogeneous Network

Pcell/Pscell/Scell: Primary/Primary Secondary/Secondary cell

CSI-RS/DM-RS/SS Block/PSS/SSS: acronyms for reference signal (RS) or Primary/Secondary Synchronization Signals (PSS/SSS), normally called collectively xSS/xRS DC: Dual Connectivity MC: Multi-connectivity SRS: Sounding Reference Signal CRS: cell-specific RS HO: Handover HOF: Handover Failure

EN-DC: EUTRAN-NR DC

TOS: Time of Staying

NG-C: Next Generation (Core Network) Control Plane in 5G

TTT: Time To Trigger

NG-U: Next Generation (Core Network) User Plane in 5G

MAC: Medium Access Control

RNC: Radio Network Controller in 3G

FDM: Frequency Division Multiplexing

UDN: Ultra-Dense Network

TDM: Time Division Multiplexing

RAR: Random Access Response

AU: Area Update

TA: Tracking area

RNA: RAN Notification Area

CDM: Code Division Multiplexing

SIB: System Information Block

DRX: Discrete Reception

PF/PO: Paging Frame/Paging Occasion

TAU: Tracking Area Update

RNAU/RLAU: RAN Notification Area Update/RAN Location Area Update

FIG. 1 illustrates a network 100 for communicating data. The network 100 comprises a base station no having a coverage area 101, a plurality of mobile devices 120, and a backhaul network 130. As shown, the base station no establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a next generation NodeB (gNB), a transmit/receive point (TRP), a DU of the base station, a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), LTE Advanced Pro (LTE-AP), High Speed Packet Access (HSPA), Wi-Fi 802.11a/b/g/n/ac/ax/ad/ay, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

In a NR/NGC system, for example, a user equipment (UE) or other receiver may receive transmissions that have been transmitted with the use of beamforming and beam sweeping. In beamforming, a transmitter may direct transmissions in one or more specific directions if the transmitter cannot achieve the needed range when transmitting omni-directionally. However, a transmitter typically cannot beamform in all directions at once, so the transmitter may sweep multiple beamformed transmissions of certain beamwidth through multiple directions over time. For example, at a first time, a transmitter may transmit a first beam in a first direction. At a second time, the transmitter may transmit a second beam in a second direction with a defined offset from the first direction. Such transmissions may continue such that the transmitter sends beams throughout its coverage area. Thus, the transmitter effectively transmits omni-directionally over time, but at any one instant, the transmitter transmits in only one direction. In general, the transmitter transmits a plurality of beamformed beams in a sweeping pattern such that at least one beam is transmitted in every portion of the coverage area of the transmitter. The transmitter may be a base station, an evolved node B (eNB), a next generation node B (gNB), a transmit/receive point (TRP), or a similar component. Alternatively, the transmitter may be a UE or a similar component.

A UE may enter a low-power idle state when no data communication with a network is occurring. When the network wishes to communicate with an idle UE, for example, the network may send a page to the UE. Pages are typically transmitted only on paging occasions that occur at periodic intervals known to both the UE and the network. When a paging occasion occurs, the UE wakes up momentarily to determine if the network has sent a page. If no page has been sent, the UE may return to the idle state. If a page has been sent, the UE may listen for a page message corresponding to the page and may follow instructions contained in the page message, such as instructions to receive data or initiate procedures to connect to the network.

Figure 2:
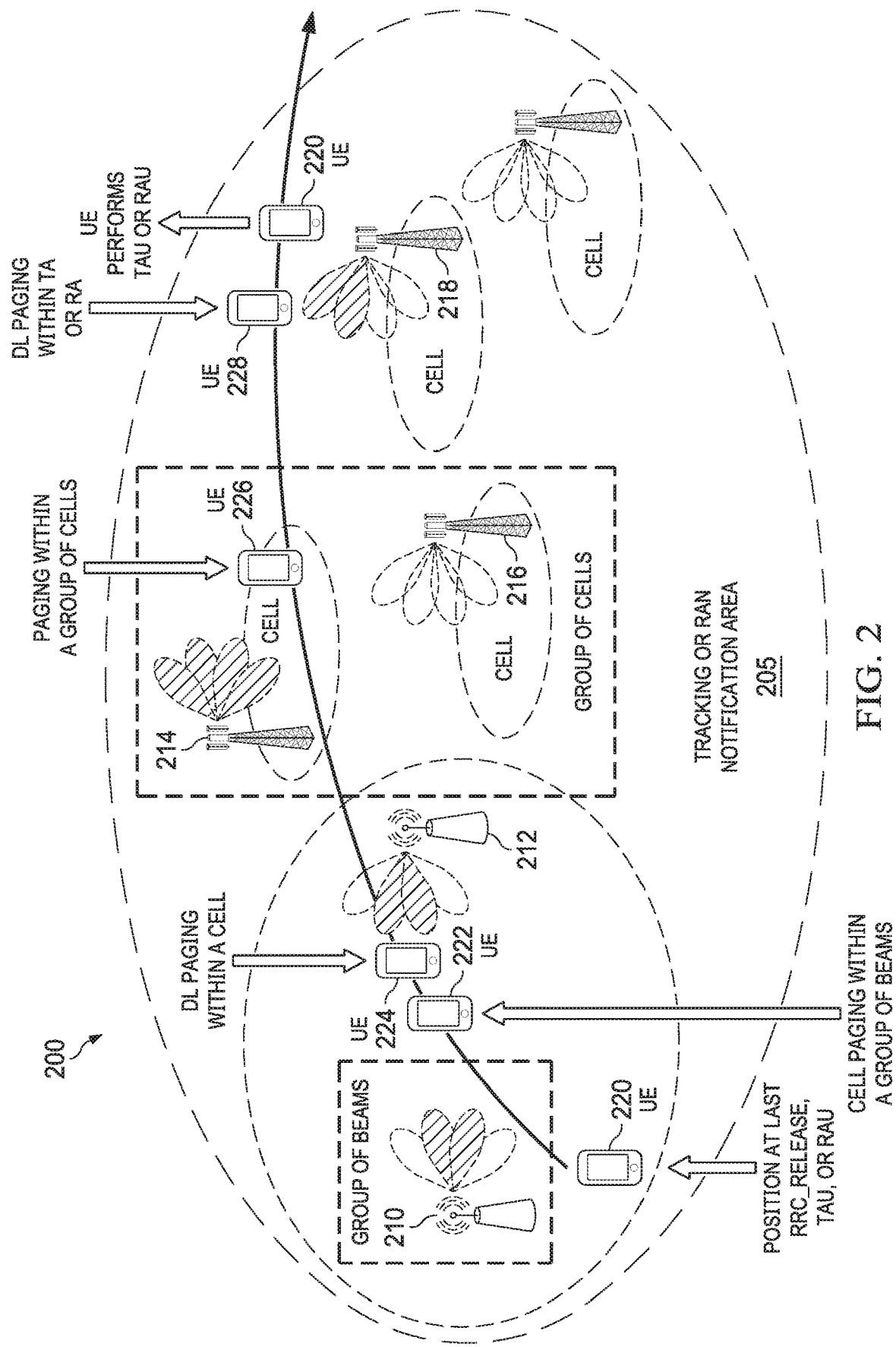
FIG. 2 illustrates a diagram of an embodiment communications system highlighting downlink paging and uplink area update (AU) for a user equipment (UE) in idle or inactive state mobility.

FIG. 2 illustrates a diagram of an embodiment communications system 200 highlighting downlink paging and uplink area update (AU) in idle or inactive state mobility. FIG. 2 illustrates paging actions when a UE traverses a cell or a group of high frequency (HF) or narrow-beamformed cells in idle or inactive state mobility. Communications system 200 includes a tracking area (TA) or a typically smaller radio access network (RAN) notification area (RA) 205. Within the tracking or RAN notification area 205 are a plurality of TRPs, such as TRP 210, 212, 214, 216, and 218. Communications system 200 also includes a UE 220 that is moving through the TA or RA 205. Initially, UE 220 is located within a cell served by TRPs 210 and 212.

As UE 220 moves, it enters a coverage area of TRP 210, where it is now shown as UE 222 to prevent confusion. UE 222 may be paged by downlink pages transmitted by TRP 210 using a group of beams of TRP 210. As UE 222 continues to move, it enters a coverage area of TRP 212, where it is now shown as UE 224 to prevent confusion. UE 224 may be paged by downlink pages transmitted by TRP 212 using a group of beams of TRP 212.

As UE 224 continues to move, it exits the coverage area of the cell served by TRPs 210 and 212 and enters a coverage area comprising a group of cells, where it is shown as UE 226 to prevent confusion. UE 226 may be paged (or group paged) within the group of cells by one or more cells that are closest to or with highest quality channel with UE 226, for example, including cells of TRPs 214 and 216. As UE 226 continues to move further, it exits the coverage area of the group of cells, where it is shown as UE 228 to prevent confusion. UE 228 may be paged in a cell of TRP, e.g., TRP 218, which is within TA or RA 205. As UE 228 further moves, it exits TA or RA 205 (where it is shown as UE 220 to prevent confusion). As UE 220 exits TA or RA 205, UE 220 performs a tracking area update (TAU) or a RAN notification area update (RNAU).

A UE in the RRC_Idle state or the RRC_Inactive state monitors paging/notification in overlapping Discontinuous Reception (DRX) cycle and paging cycle (and paging opportunity), when pages can be transmitted at least using DL beam sweeping and UE is scheduled to wake up to DRX ON. The content of the paging may be a paging indicator or a paging message. In addition, for paging in multi-beam operation, in conventional design, the beam sweeping is performed in a Paging Occasion (PO) of a paging frame (PF), which corresponds to a DRX ON status of one or more UEs that are being paged. Each PO may consist of multiple contiguous or non-contiguous paging times slots. Each paging slot may correspond to one or more subframes or Orthogonal Frequency Division Multiplexing (OFDM) symbols, and each paging slot may consist of a set of one or more directional beams (such as Synchronization Signal (SS) blocks or SSBs) with paging information in each beam. Different slots may carry different sets of DL transmission beams to sweep, but repetition of the same transmission beam set in different slots may happen to help the UE synchronize to the DL transmission beams.

In LTE, the eNB and the UE calculate a PF/PO number accordingly for page and wakeup, respectively, and then transmit or receive, respectively, the messages in the PDCCH or the PDSCH on the calculated PF/PO number. LTE paging is delivered similarly to any downlink data using the PDCCH and the PDSCH, where the paging message transmitted on the PDSCH is allocated transmission resources by a scheduling assignment on the PDCCH addressed to the P-RNTI (which is shared by all UEs). The delivery channel is cell-specific, since both the assisting reference signals (the Cell-specific Reference Signal (CRS)) and the scrambling are derived from the Physical Cell Identity (PCI).

The PF/PO is given by following equations:

PF: SFN mod $T=(T$ div $N)*(UE\_ID$ mod $N)$, and

PO: $i\_s$=floor(UE_ID/$N$) mod $Ns$.

where
  Index i_s points to PO from the following subframe pattern with the parameter Ns, which is defined for FDD and TDD as a function of i_s in TS36.304, T is the DRX cycle of UEs,
  nB is one of the set {4T, 2T, T, T/2, T/4, T/8, T/16, T/32},
  N=min(T, nB), Ns=max(1,nB/T),
  UE_ID is from IMSI (USIM) or 0 (if no USIM for emergency call): UE_ID=IMSI mod 1024,
  IMSI is given as sequence of 10 digits of type Integer (0 . . . 9), and
  UE_ID has the length of 10 bits, which means that there are 1024 groups of mobile terminals.

In an LTE paging, AU, or DRW procedure, during the DRX wakeup (ON) period (which overlaps with the PO, for example), a UE takes four actions. One action is cell search (PSS/SSS) detection. A synchronization signal may be sent by the network just before a DL page message in the same PO (if a page of the UE occurs at all) in the UE's DRX ON occasion. Another action is DL (CRS) measurement. In another action, if a PO is provided for the UE by the network, and a paging message is sent in the UE's DRX wakeup (ON) period, the Physical Broadcast Channel (PBCH)/Master Information Block (MIB) and the PDCCH/SIB are decoded, and the PDCCH and page (in PDSCH) messages are received and decoded by the UE. Alternatively, in another action, if PSS/SSS measurement meets the cell search criteria (during consecutive PSS/SSS measurements by the UE between two paging occasions), the UE performs a cell search instead.

It may be noted that, in similar procedures in NR, the above four steps may need to be repeated at the slot level, in case a PO consists of multiple "slots" (or SS blocks), each of which corresponds to a different beam direction. Hence, the complexity for adopting the above in NR is much higher than in LTE.

RAN Working Group 2 (RAN2) has made several agreements regarding paging. According to RAN2, a UE in the Inactive state is reachable via RAN-initiated notification and CN-initiated paging. RAN and CN paging occasions overlap, and the same paging or notification mechanisms are used. A RAN node can configure a UE in the RRC_Inactive state with a RAN-configured paging DRX cycle, which could be a UE-specific configuration. A UE in the RRC_Idle or RRC_Inactive state monitors paging or notification in a scheduled DRX cycle. A UE monitors one paging occasion in the DRX cycle. A paging occasion is the time interval over which a paging message is transmitted by the gNB. The length of a DRX cycle is configurable. A default DRX cycle length is provided in system information. Additionally, a UE-specific DRX cycle length can also be provided to a UE through dedicated signaling. The number of paging occasions in the DRX cycle is configurable and provided in system information. If multiple paging occasions are configured by the network in the DRX cycle, then UEs can be distributed to these paging occasions based on UE ID. Paging can be transmitted at least using beam sweeping. The content of the paging may be a paging indicator or a paging message. A paging occasion can consist of multiple time slots (e.g., a subframe or an OFDM symbol). The use of multiple time slots may enable transmission of paging using a different set of DL transmission beams in each time slot or may enable repetition. The number of time slots in a paging occasion is provided in system information.

RAN2 has also made agreements about RAN-initiated paging, i.e., paging in the RRC_Inactive state using DRX (which excludes extended DRX, if supported). The same paging occasion calculation mechanism is used for UEs in the inactive state as for UEs in the idle state. The same input is derived from the core network (CN) UE ID and the same calculation equation is used to calculate the paging occasion for RAN-initiated paging and CN-initiated paging. The gNB needs to know the input derived from the CN UE ID to be used in the calculation and the CN UE-specific DRX cycle from the next generation core network. A UE in the inactive state can be configured with a UE-specific RAN DRX cycle over dedicated signaling. A UE uses the shortest of the CN UE-specific DRX cycle, the cell-broadcast DRX cycle, and the RAN DRX cycle. All the DRX cycle values must be multiples of each other. A UE-specific RAN DRX cycle is released when the UE enters the idle state. A UE-specific RAN DRX cycle is kept when the UE moves to a new cell in the RAN area in the inactive state.

In existing paging techniques, four options for NR paging operations have been identified, and any one of the options may be selected in a given scenario. In Option 1, paging DCI is followed by a paging message, but not necessarily consecutively. In Option 2, a paging group indicator triggers UE feedback, and paging DCI is followed by a paging message. In Option 3, a paging group indicator and paging DCI are followed by a paging message. In Option 4, paging DCI indicates the use of Option 1 or Option 2. None of these options provides the embodiment technique of group-based HF paging base stations plus LF macro-assistance, particularly as an embodiment of paging policies. These options refer to a group of UEs, not the grouping or selection of HF stations (SgNBs) in the embodiment hierarchical paging techniques.

Option 1 provides direct paging based on DL narrow beam sweeping. In Option 1, DL beams are swept by the network for all directions, each with identical DL page information and signals. The PF/PO structure (such as the definition of slots or the patterns of the slots, or PO/PF structure for beam sweeping), and the use of synchronization signal blocks (SSBs) for paging (e.g., determined by scheduling or blind decoding), remain in discussion. Time division multiplexing (TDM) and frequency division multiplexing (FDM) multiplexing of paging SSBs, PBCH/MSI and PSCH may be used in Option 1.

In Options 2 and 3, group or response-driven paging may be performed. This may involve two-step paging. In one example, a group paging indicator may be broadcasted explicitly by the network, and then followed by receiving UE paging response (with preambles pre-associated to the group ID). Alternatively, a group paging indicator may be configured and broadcasted as a bitmap of group identification (e.g., a P-RNTI) against which each UE may hash its SAE-temporary mobile subscriber identity (S-TMSI) without response, e.g., with implicit or explicit UE beam reporting. The network may then send UE-specific paging based on the response.

Figure 3:
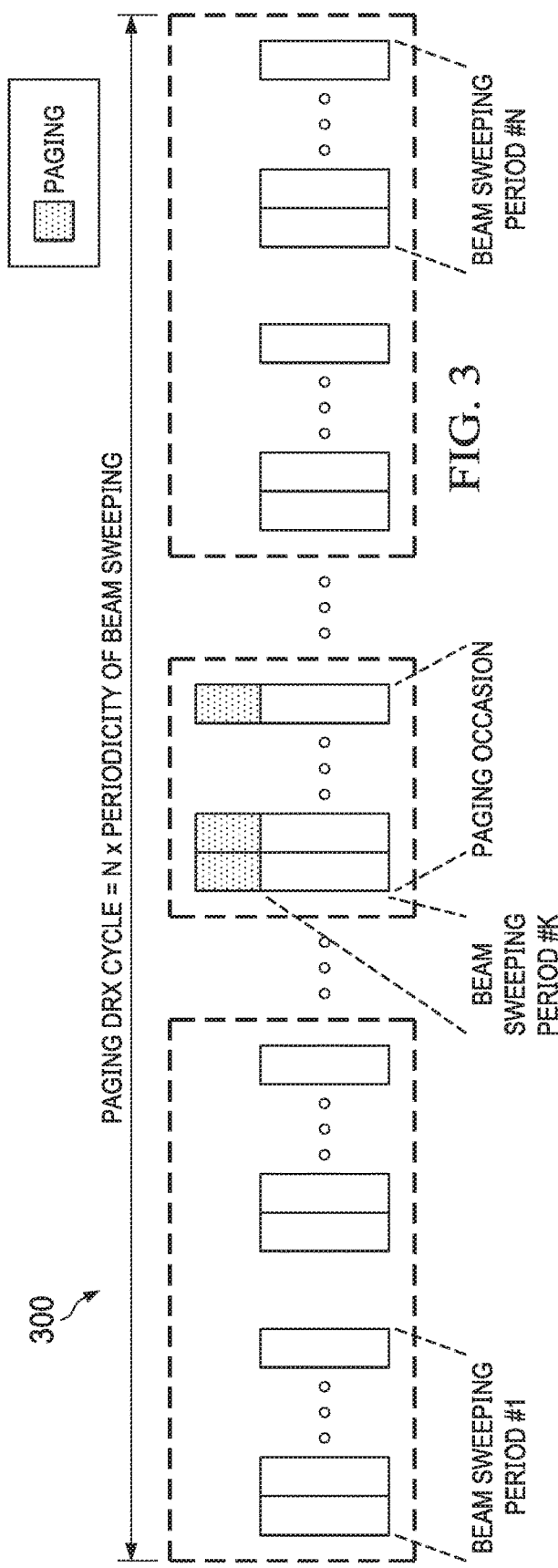
FIG. 3 illustrates a diagram of a standalone new radio (NR) paging discrete reception (DRX) cycle with TDM and FDM multiplexed beam-sweeping occasions and paging occasions.

FIG. 3 illustrates a diagram of an example a standalone NR paging DRX cycle 300 defined based on a beam sweeping period under Option 1. FIG. 3 illustrates the TDM and FDM of beam sweeping (for PDCCH SSB/PBCH broadcasting) and SA HF paging (in PDSCH). The NR paging DRX cycle 300 includes TDM and FDM multiplexed beam-sweeping occasions and paging occasions. In this example, the paging occasion occurs during the k-th beam sweeping period.

It is well known that beam sweeping-based paging has a high overhead due to the loading effects of beam sweeping, and it is difficult or complex to define an efficient scheme to properly align the transmission opportunities of a paging reference signal (such as an SS block), a PO, a PF, a radio frame, a slot structure in each PO, and the associated beam sweeping pattern.

Figure 4:
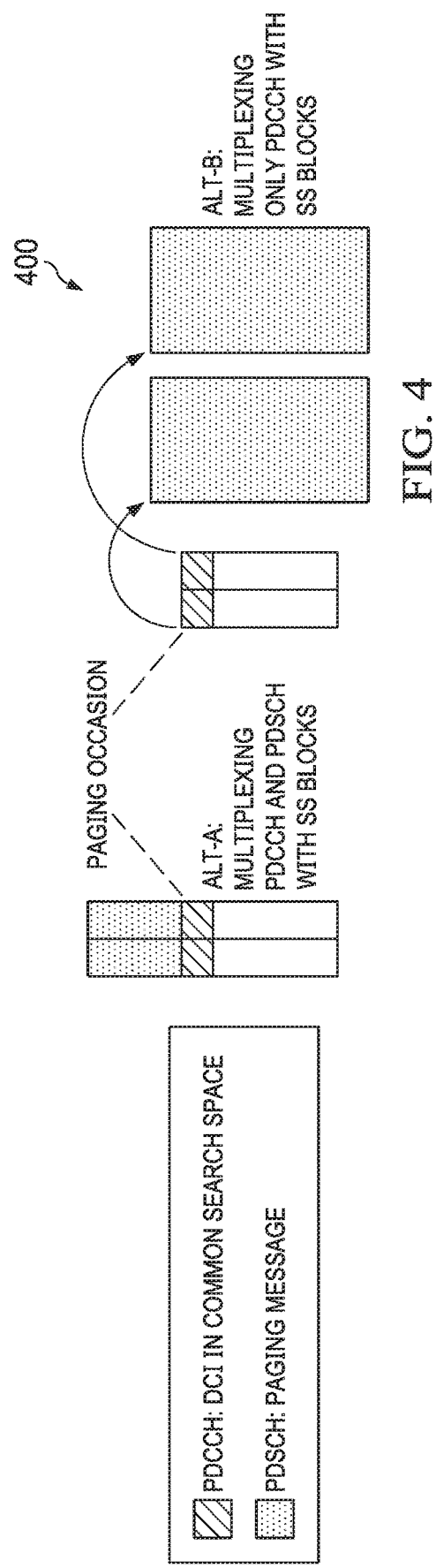
FIG. 4 illustrates a diagram of TDM and FDM multiplexed paging occasions.

At least to partially improve the efficiency of direct paging, some optimization has been done as shown in FIG. 4, where FDM of paging occasions (PDCCH with paging DCI) and a corresponding configuration, paging and RMSI messages (in PDSCH), and beam-sweeping of SSB/PBCH (with MIB) may be supported. FIG. 4 illustrates a diagram of TDM and FDM multiplexed paging occasions 400. Frequency multiplexing of the paging occasions is utilized to optimize direct paging under Option 1.

As shown in FIG. 4, one optimization approach is to frequency multiplex multiple POs (each PO may have multiple slots and carries paging DCI) over the same duration of a PO to share the same spatial direction (i.e., the same transmission beam). Another approach is to frequency multiplex POs with SS/PBCH blocks processed by a quasi-co-location (QCL) technique. It may be noted that it has been agreed that a UE may assume QCL between SS blocks, paging DCIs, and paging messages.

In one case, different beam directions are time division multiplexed within one paging frame for transmitting frequency division multiplexed POs and SS/PBCH blocks. A properly configured time/frequency multiplexing mechanism allows more compact transmission of QCL-ed SS/PBCH blocks and POs with a paging control resource set (CORESET) (i.e., paging DCI). While such optimizations may greatly improve the efficiency, the optimizations may come at the cost of higher UE-side capability or complexity.

Even with the optimizations, when the CN pages an idle UE for mobile terminated (MT) data or voice connections, the CN may still need to notify (e.g., by an S1 or NG-C backhaul message) a potentially large number of (HF) gNBs to page the UE by beam sweeping and repeat the NR-SS/PBCH or paging reference signals plus the paging message in all directions, and then blindly wait for the UE response for beam alignment, etc. In this process, the power consumption of the UE and the signaling cost at the network side may be high.

Thus, it may be noted that the beam sweeping-based NR paging schemes may be limited to NR SA scenarios, may see high beam sweeping and signaling overhead, and may not cover the NSA (e.g., EN-DC) or SA (NR-NR) scenarios where the wide-beam or LF paging in a main cell may assist the narrow-beam or HF paging design in a secondary cell.

Option 2, with the group paging, may require a UE response, where some form of short group paging indicator may be sent on all beams, and UEs that match with the indicator may send a response to the network to request delivery of the actual paging message.

Figure 5:
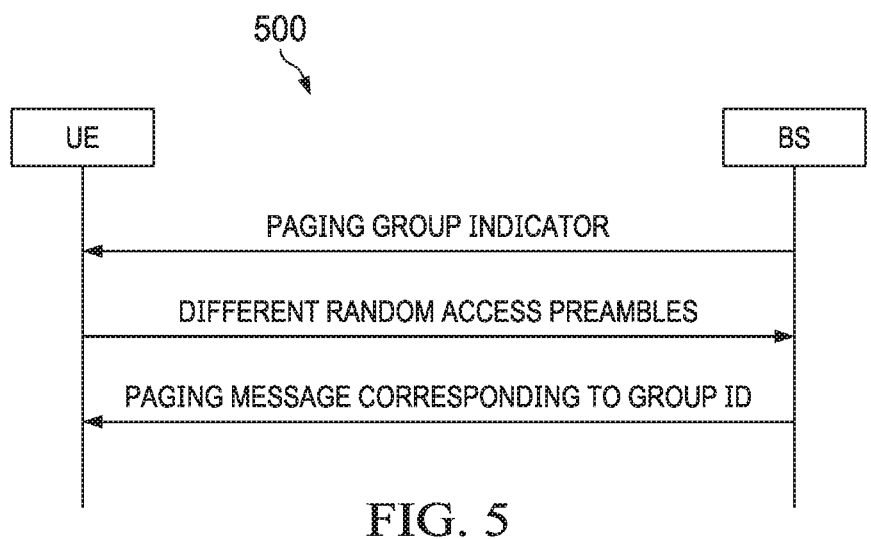
FIG. 5 illustrates a diagram of a response-based group paging procedure.

As shown in the messaging diagram 500 of FIG. 5, which illustrates a response-based group paging procedure, multiple UEs in the area or PO may be assigned a common group ID and the short paging group indicator may be used to page the common groups. If a common group ID is alerted, all the UEs assigned to the group may need to send the random access request. Different random access preambles can be used to associate to different group IDs. The paging message delivered to the UEs may contain only the UE IDs of the paging group corresponding to the received preambles in each beam, as shown in FIG. 5. Thus, the paging message content can be reduced.

In the response-based group paging, as in Option 2, a UE trades off the UL response messages with DL paging granularity, and may consume more power than in direct paging when UL responses cost more than the saved DL paging wakeups or false alarms. On the other hand, compared to direct paging, group paging saves power at least for the UEs not in the group to be paged. In fact, gain or loss depends on the concrete NR paging area density (in a TA or RNA) of UEs to be paged, the efficiency of DL vs. UL beam alignment, and the UEs' RRC states. Regardless of whether Option 2 or Option 3 is selected, either option may have the same problem of possibly frequent beam sweeping or tracking, i.e., a costly spatial beam alignment process, each time the UE has to wake up from the scheduled paging opportunities or slots to receive paging reference signals or to transmit the page response or the RACH. This case may remain true regardless of whether the UE is in the RRC_Idle state or the RRC_Inactive state, and the problem may worsen when the UE moves or wakes up more frequently.

Thus, it may be noted that a beam sweeping-based NR paging scheme, regardless of whether direct paging or group paging is used, may not be able to avoid the high overhead of beam sweeping or beam alignment when a UE being paged may need to receive the paging signals or may need to transmit the UL response or the RACH.

Compared to the mainstream beamforming-based NR paging for SA NR systems, it may be preferable to have LF and HF systems interwork via the DC framework and take advantage of wide LF coverage for efficient paging and beamformed data connection setup in HF for fast data transportation. A LF assisted HF paging mechanism has been provided for paging UEs in a NR DC based communications system. This mechanism utilizes the more efficient (quasi) omni-directional LF broadcasted paging to either replace or assist the less efficient beam-sweeping based paging, particularly for HF deployments. This idea may be applied to both intra-NR (NR-LF+NR-HF) and inter-Radio Access Technology (RAT) (LTE-LF+NR-HF) DC scenarios, e.g., utilizing the LF cell as the master and paging/RRC entity, and known HF cells in the master's coverage as the slaves. As an example, it may be assumed that a UE has both LF and HF capabilities. For non-standalone HF cells, based on the previous discussion and observations, it may be less of a concern that the system and paging information of the cells would be more efficiently broadcasted by the master cell of the LF layer.

In general, for wide-beam (LF) paging assistance to narrow-beam (HF) systems, e.g., for UE-TRP discovery or narrow-beam connection setup, the following process may be helpful: LF signaling tells the UE when (e.g., frame boundary) or which direction (geographical, digital, or coordinate) to monitor the HF DL, or roughly when or which direction or which preamble for the RACH to use. By doing so, the HF SgNB or TRP and the UE can synchronize in HF both spatially and in time and frequency much faster than an SA HF system, and can avoid triggering SA beam sweeping-based DL paging involving all or a number of HF SgNB/TRPs in the RNA.

Figure 6:
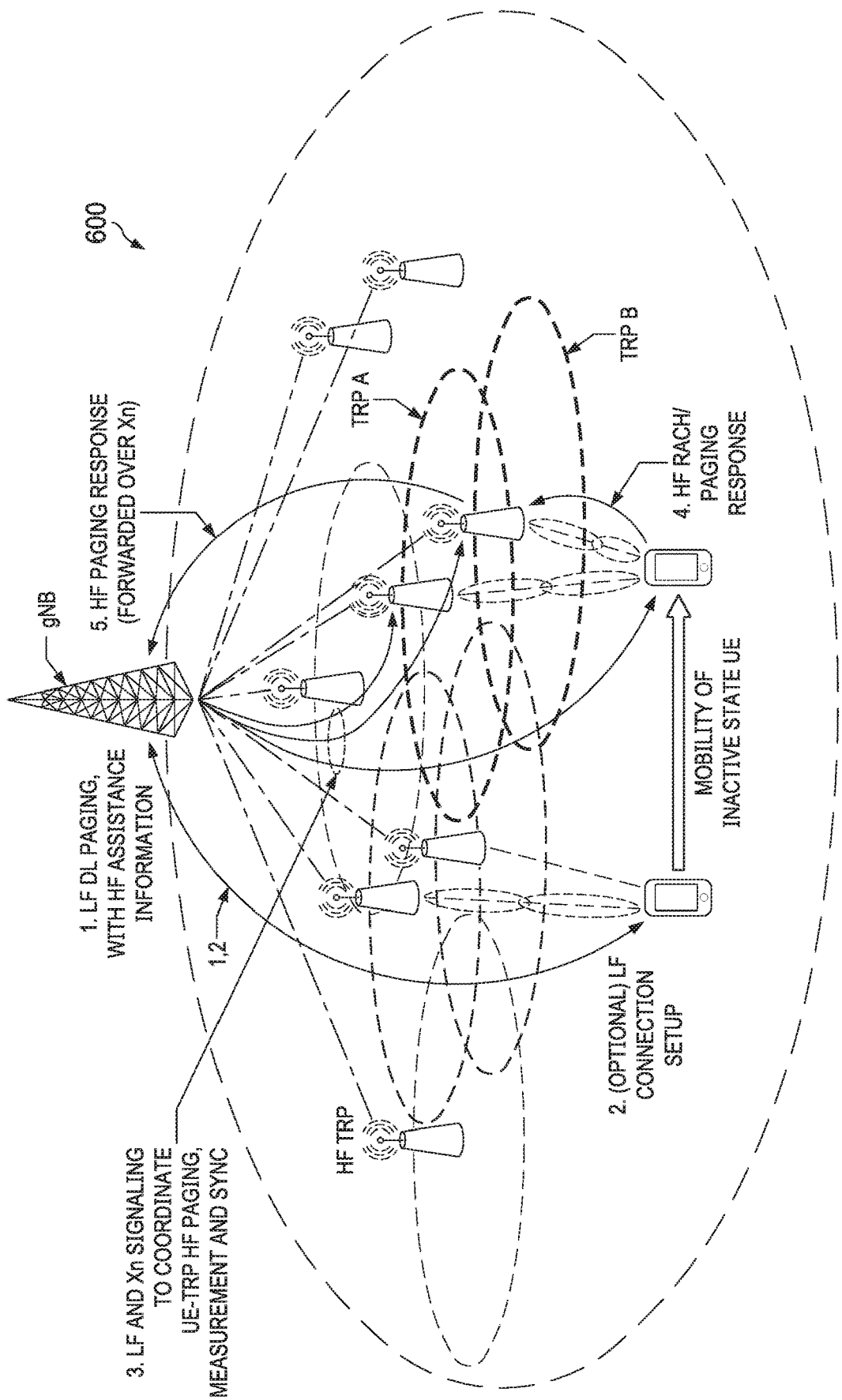
FIG. 6 illustrates a diagram of a communications system highlighting low frequency (LF)-assisted downlink paging and data radio bearer (DRB) setup in high frequency (HF) cells.

FIG. 6 illustrates a diagram of a communications system 600 highlighting LF-assisted DL paging and data radio bearer (DRB) setup in HF cells. The communications system 600 includes a main channel served by a gNB (i.e., MN) and a secondary channel served by TRPs in HF (i.e., SNs), such as TRP A and TRP B. The TRPs are in the coverage area of the gNB, or under control of the gNB. A UE is served by the gNB and also one or more of the TRPs, such as TRP A and TRP B. As the UE moves, it may move out of coverage of one or more TRPs and enter into coverage of one or more other TRPs.

At step 1 of FIG. 6, the gNB performs LF paging to page the UE. The gNB may transmit HF assistance information to the UE. The LF layer may help broadcast HF layer needed SI, etc. By doing so, the HF paging overhead for an idle/inactive UE can be significantly lowered if the HF system or paging information or the list of neighborhood HF cells (with geo-assistance information) are broadcast by LF system information or paging messages without the necessity of LF RRC connection setup, or signaled over a pre-existing UE-specific LF RRC connection. For example, the HF Remaining Minimum System Information (RMSI) may be broadcasted or uniquely RRC signaled by the LF to the UE, while on-demand SI or high-speed data may be transmitted by designated beam pairs (i.e., DRBs) in HF. Doing so may save the UE power that may otherwise be consumed in blindly scanning and beam sweeping the nearby HF SN's, if any.

At step 2 of FIG. 6, the gNB and the UE may exchange signaling for LF connection setup, and also HF assistance information. Step 2 may be optional. The LF connection may be avoided if the sole purpose is to transfer the UE out of the inactive or idle state and set up a high-speed HF data connection. However, an LF RRC connection may help better coordinate the UE and HF cells to find and synchronize with each other. Using the LF RRC connection, the LF layer may better help coordinate between the UE and its neighborhood HF cells to achieve HF synchronization (in the time, frequency, code, or spatial beam direction) during its (HF) paging process.

At step 3 of FIG. 6, the gNB may exchange signaling with TRP A and TRP B and the UE to coordinate UE-TRP HF paging, measurement and synchronization. The LF MN may notify the UE in the paging message over the Uu interface about the beam direction or (geo-)location of one or more specific HF SNs, and notify the HF SNs over an Xn interface about the idle/inactive UE's HF paging occasions and RACH opportunities. Then the UE, based on its own direction or location and the received LF paging message, may determine the HF nodes' proximity and narrow down the target HF SgNBs or TRPs, the HF spatial beam directions, and the time or code or frequency opportunities to RACH to, while the specific target HF SgNBs or TRPs may be prepared for the UE's RACH or UL paging response. Doing so may avoid triggering a large number of HF SNs to broadcast repetitively the same paging information to the UE.

At step 4 of FIG. 6, the UE sends HF RACH or a paging response to the TRP B. The HF layer beamforming-based temporal/frequency/spatial/code-space alignments may be used by the UE to quickly RACH or send back an HF paging response, or to set up a HF beamformed high-speed data connection. Any HF RRC state transitions (if a split signaling radio bearer (SRB) is to be supported in DC) or the HF data connection setup can be done quickly and with power efficiency.

The LF paging by the MgNB may precede any HF actions. That is, the LF may schedule the HF NR-SS/PBCH block, the associated PF/PO/slot, and the coordinated HF alignment, synchronization, or paging information as discussed above. This enables the UE to have a faster and more power-saving HF wakeup, e.g., by skipping the DL HF synchronization to many unknown HF SgNBs and jumping directly to the UL HF RACH to specific SgNBs at specific moments or directions.

At step 5 of FIG. 6, the TRP B sends paging response to the gNB. The DL LF paging and the HF paging (or UL response, or RACH) may be opportunistically or sequentially mixed together. This may be a mixed LF (DL) paging and HF (UL) paging response, including steps 4 and 5. The LF DL paging may be responded to on the UL by the paged UE through a HF SgNB or TRP, so that the necessity of HF layer DL beam sweeping is minimized or DL/UL beam alignment speeds up over the entire LF cell coverage. The HF paging response can then be relayed to the MN (e.g., a gNB) by the SN (TRP B), which may acknowledge the LF paging or help any needed LF connection setup.

Figure 7:
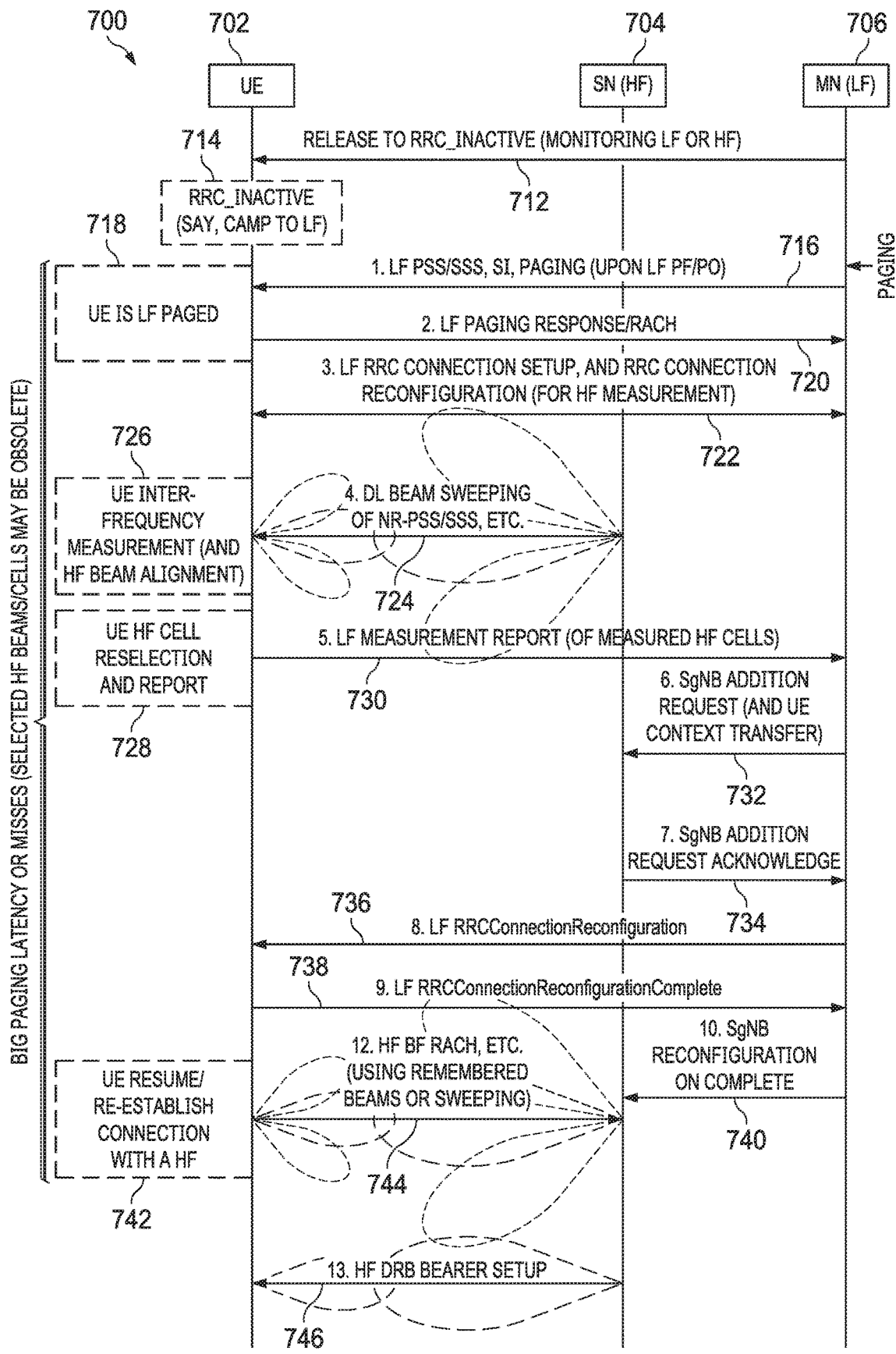
FIG. 7 illustrates a diagram of a LF page and HF (beam-swept) paging method in a LF and HF DC based communications system.

FIG. 7 illustrates a diagram of a conventional paging method 700 performed in a LF and HF DC based communications system. The method 700 is an independent LF page and HF (beam swept) method. The method 700 shows communications between a UE 702, an SN 704 operable in the HF, and an MN 706 operable in the LF. Specifically, FIG. 7 shows communications flows for paging the UE 702, communications flows for reselecting cells by the UE 702 as specified in 3GPP TS 38.304 and 3GPP TS 36.304, and communications flows for DC's secondary node (e.g., a SgNB) addition as specified in 3GPP TS 36.300 and 37.340. The UE 702 may camp to the LF (i.e., the MN 706), which is shown in FIG. 7, or camp to the HF (i.e., the SN 704), by following instructions from broadcasted system information (SI), RRC messages, or pre-stored system information.

As shown, at step 712, the MN 706 may send a "Release to RRC_Inactive" message to the UE 702 to transition the UE 702 to the RRC_Inactive state. The UE 702 may monitor the LF or the HF. At step 714, the UE 702 enters the RRC_Inactive state. In this example, the UE 702 has camped to the MN (i.e., LF). At step 716, when there is a need to page the UE 702, the MN 706 LF pages the UE 702, and sends, to the UE 702, an LF primary synchronization signal (PSS), a secondary synchronization signal (SSS), system information (SI), a paging message in an LF PF or PO. At step 718, the UE 702 is LF paged. When the UE 702 detects the paging message, at step 720, the UE 702 sends an LF paging response or a RACH message to the MN 706. At step 722, the UE 702 and the MN 706 perform LF RRC connection setup and RRC connection reconfiguration (e.g., for HF measurement). At step 724, the SN 704 may send NR-PSS or SSS and other information to the UE 702, e.g., by performing HF DL beam-sweeping. At step 726, the UE 702 may perform inter-frequency measurement or HF beam alignment based on the information from the SN 704. At step 728, the UE 702 may perform HF cell reselection and generate a measurement report of measured HF cells, such as the SN 704. At step 730, the UE 702 sends, in LF, the measurement report of the measured HF cells to the MN 706. At step 732, the MN 706 may send a SgNB Addition Request to the SN 704. The MN 706 may also send UE context transfer request to the SN 704. At step 734, the SN 704 sends a SgNB Addition Request Acknowledge to the MN 706. At step 736, the MN 706 may send an LF RRC Connection Reconfiguration to the UE 702, and receives an LF RRC Connection Reconfiguration Complete message from the UE 702 at step 738. At step 740, the MN 706 sends a SgNB Reconfiguration Complete message to the SN 704. At step 742, the UE 702 may resume or re-establish connection with a HF node, such as the SN 704. At step 744, the UE may send an HF BF RACH message or other information to the SN 704 to establish HF connection with the SN 704. The UE 702 may use the remembered beams or sweeping pattern to communicate with the SN 704. At step 746, the SN 704 performs HF DRB bearer setup with the UE 702. In the example of FIG. 7, the selected HF beams or cells by the UE 702 at the time of steps 724-728 may become obsolete when steps 738-744 are performed, since it takes quite some time for the UE 702 to establish connection with the HF SN. This may cause large paging latency or paging misses.

Figure 8:
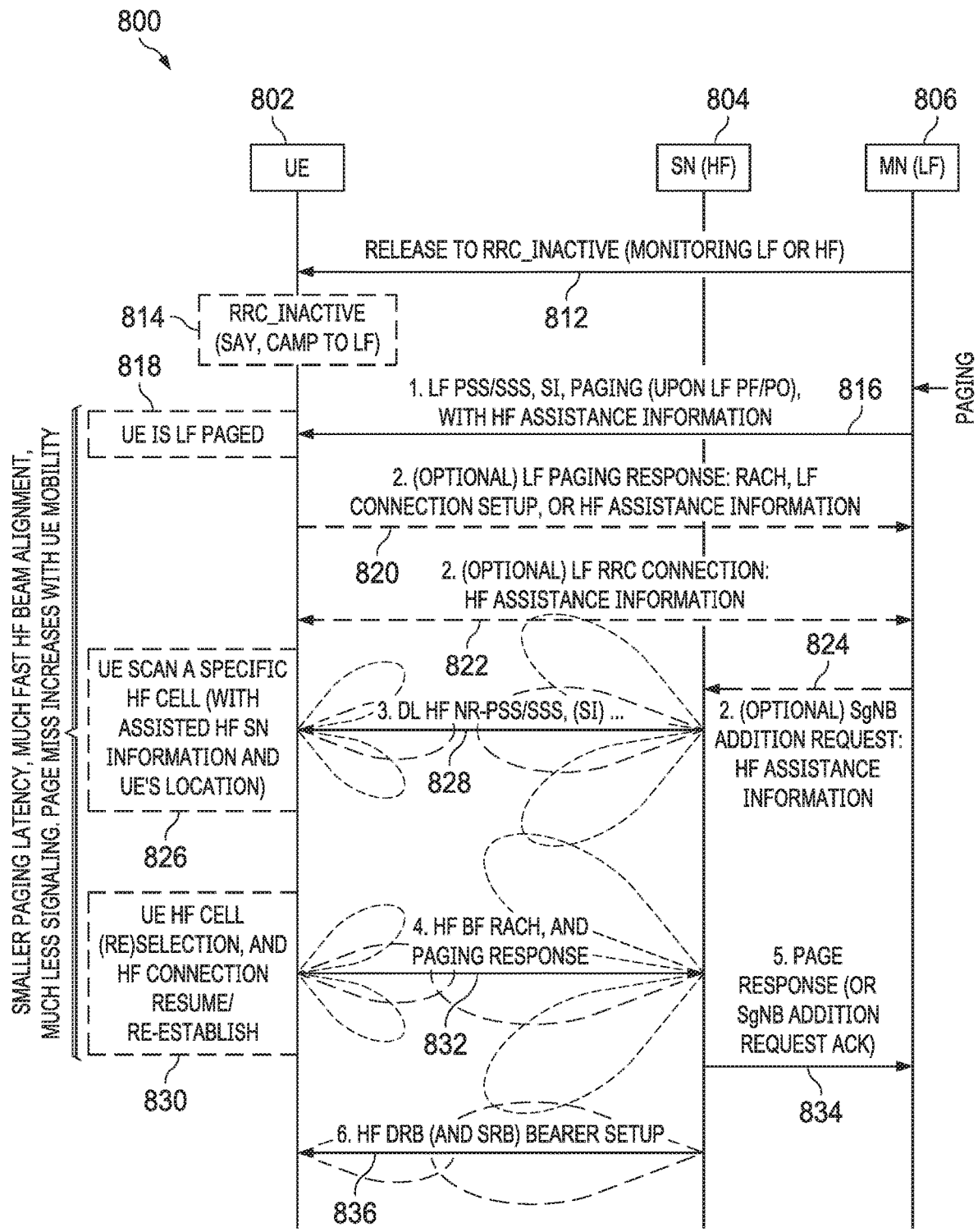
FIG. 8 illustrates a diagram of a LF-assisted-HF-paging method in a LF and HF DC based communications system.

FIG. 8 illustrates a diagram of a conventional LF-assisted-HF-paging method 800 performed in a LF and HF DC based communications system. The method 800 shows communications between a UE 802, an SN 804 operable in the HF and an MN 806 operable in the LF. In this example, the UE 802 may camp and perform cell reselection similarly to what has shown in FIG. 7. However, the method 800 utilizes the LF-assisted-HF-paging mechanism as discussed previously, where HF assistance information is communicated and used in paging. This helps reduce the paging latency and signaling overhead, require reduced power consumption and enable faster HF alignment.

The steps 812-818 are generally similar to the steps of 712-718 of FIG. 7, and thus will not be repeated herein. However, one difference is that at step 816, the MN 806 may also transmit HF assistance information to the UE 802 when paging the UE 802. The HF assistance information may include direction, location, or positioning information of one or more HF SNs, such as the SN 804, SI, time, code, and frequency resource information, scheduling information of the one or more HF SNs, etc. Obtaining of the HF assistance information may help expedite the HF synchronization process, paging process, or connection setup process. At step 818, optionally, the UE 802 may respond the MN 806 with a LF paging response or a RACH message to start the RACH procedure. The UE 802 may also perform LF connection setup with the MN 806. The UE 802 may further transmit some HF assistance information to the MN 806, such as geo-location of the UE 802. Optionally, at step 822, the UE 802 and the MN 806 may perform LF RRC connection, during which the UE 802 and the MN 806 may exchange HF assistance information with each other. The steps 820 and 822 may be performed together or in different order. Optionally, at step 824, the MN 806 may send a SgNB Addition Request to the SN 804. The MN 806 may send HF assistance information, such as location information of the UE 802, to the SN 804. At step 826, the UE 802 may scan a specific HF cell based on the HF assistance information and the UE's location. During the scanning of the UE 802, at step 828, the SN 804 may page the UE 802, and send, in downlink, a HF NR-PSS and SSS, and other information, such as SI, to the UE 802. At step 830, the UE 802 performs HF cell (re) selection and HF connection resume or re-establish. At step 832, the UE 802 may initiate a RACH process with the selected HF cell, such as the SN 804, and send a HF BF RACH message and a paging response to the SN 804. At step 834, the SN 804 sends a page response to the MN 806. The SN 804 may also send a SgNB Addition Request ACK message in response to the SgNB Addition Request received. At step 836, the SN 804 performs HF DRB (and SRB) bearer setup with the UE 802. Compared to the approach in FIG. 7, this example has an advantage of smaller paging latency, faster HF beam alignment and less signaling overhead. Page misses may still be increased with UE mobility increased.

In the method Boo, the MN 806 may LF signal, to UE 802, the HF SNs' location information at the step 816, or step 822. The UE 802 may use this information to locate a HF SN in its proximity. The UE 802 may report, to the MN 806 through LF, its location based on a global navigation satellite system (GNSS) or any assisted-GPS (A-GPS) (e.g., triangular location) at step 820 or 822. The MN 806 may also track the UE 802's location and time information (when the UE 802 is moving), e.g., by Fine-Time-Assistance, based on the UE 802's PRACH preambles or any other signal, e.g., a Positioning RS.

The contents and/or formats of the various messages sent by the UE 802, the SN 804 and the MN 806, as well as the ordering of the various messages and various blocks, may be changed (e.g., swapped, removed, reordered, enhanced, combined, configured, and so on) in different embodiments without changing the example embodiments presented herein.

It is noted that a connection setup process may range from the initial DL or UL synchronization and system information acquisition to random access (e.g., RACH) steps for establishing a connection, and then RRC signaling (such as Connection Request, Setup, Reconfiguration, and Complete messages, for example), which are normally more comprehensive than the paging process. However, due to assistance from the main channel, the connection setup process may be limited to minimum synchronization (e.g., in the DL) and long-term dedicated data bearer or data connection setup in the secondary channel because the secondary system information (frequency, beam, etc.) and secondary system's synchronization and data connection requirements between the UE and the TRP can be already communicated over the main channel (such as the main control channel in DC) in the form of main channel assistance or during the main channel paging. In comparison, without assistance from the main channel, paging a UE in the RRC_Idle state or the newly introduced NR RRC_Inactive state would have to adopt a costly process involving synchronization to a beam-sweeping TRP following a pre-scheduled time-spatial pattern (SS blocks (SSBs), paging opportunities, or slots, for example) to DL measurement (of a SSB, for example), PDCCH decoding (of P-RNTI for being paged or not) and PDSCH included page message decoding, and then system information acquisition and a random access (e.g., RACH) process with the secondary systems for establishing a connection before a RRC connection can be set up or resumed using RRC signaling. For discussion purposes, it is assumed that the main or master channel is LF and the secondary channel is HF, and the main channel assists in downlink paging in the secondary channel for future data communications over the secondary channel.

In the existing cell selection processes for NR or LTE idle mode or NR inactive mode, according to 3GPP TS 36.304 or 3GPP TS 38.304, cell selection is performed by one of two procedures. The first is initial cell selection (no prior knowledge of which RF channels are NR carriers). In the first procedure, the UE shall scan all RF channels in the NR bands according to its capabilities to find a suitable cell. On each carrier frequency, the UE needs only search for the strongest cell. Once a suitable cell is found this cell shall be selected. The second is cell selection by leveraging stored information. This second procedure requires stored information of carrier frequencies and optionally also information on cell parameters, from previously received measurement control information elements or from previously detected cells. Once the UE has found a suitable cell the UE shall select it. If no suitable cell is found the Initial Cell Selection procedure shall be started. Note that priorities between different frequencies or RATs provided to the UE by system information or dedicated signalling are not used in the cell selection process.

For LTE (3GPP TS 36.304) or NR (3GPP TS 36.308), cell selection criterion "S" defines that a cell is selectable only if it meets below conditions:

$$\text{Srxlev} > 0 \text{ AND Squal} > 0$$

where:

$$\text{RSRP } Srxlev = Qrxlevmeas - (Qrxlevmin + Qrxlevminoffset) - Pcompensation$$

(Pcompensate is to avoid UE to select a cell that is too far away from it by its Tx power capability.), and $$\text{RSRQ } Squat = Qqualmeas - (Qqualmin + Qqualminoffset),$$

where Qrxlevmin and Qqualmin are in SIB1 for cell selection, Qrxlevmin and Qqualmin are in SIB3 for candidate intra-frequency cells, or in SIB5/6/7/8 for candidate LTE/UMTS/GSM/CDMA1200 inter-frequency cells.

It is also noted that cell selection occurs when a UE leaves the RRC_Connected Mode (and entering the RRC_Idle mode), and an eNB may direct the UE towards a specific RF carrier by including "redirected carrier information" within a RRC Connection Release message, if any. Then the UE performs cell selection/reselection, camps on the (re)selected cell, and starts neighboring cell measurements, monitoring and system info acquiring. If the UE does not receive the "redirected carrier information", the UE is free to search any RF carrier.

Thus, for cell selection during initial access, the UE shall scan all RF channels in the NR bands according to its capabilities to find a suitable cell. For state transition with pre-stored information (for example, as instructed by RRC_Connection_Release or memorized from previously connected cells), the cell selection scan stored carrier frequencies if existing (and optionally also information on cell parameters), or any RF frequencies. However, the absolution priority between different frequencies or RATs provided to the UE by system information or dedicated signaling are not used in the cell selection process, particularly, there is no differentiation between LF and HF. The UE camps on a suitable or acceptable cell without absolute preference of LF or HF.

In the existing cell reselection processes for NR/LTE idle mode or inactive mode, according to 3GPP TS 36.304 or 3GPP TS 38.304, with regard to reselection priorities handling, absolute priorities of different NR frequencies or inter-RAT frequencies may be provided to the UE in the system information, in the RRC Connection Release message, or by inheriting from another RAT at inter-RAT cell (re)selection. In the case of system information, a NR frequency or inter-RAT frequency may be listed without providing a priority (i.e. the field cellReselectionPriority is absent for that frequency). If priorities are provided in dedicated signaling, the UE shall ignore all the priorities provided in system information. The prioritization among the frequencies which the UE considers to be the highest priority frequency is left to UE implementation. The UE shall only perform cell reselection evaluation for NR frequencies and inter-RAT frequencies that are given in system information and for which the UE has a priority provided. Equal priorities between RATs are not supported. The UE shall inherit the priorities provided by dedicated signaling at inter-RAT cell (re)selection. The network may assign dedicated cell reselection priorities for frequencies not configured by SI.

For LTE (36.304) or NR (38.304) cell reselection, cells to be picked by "R" criteria must meet cell selectability ("S" criteria) as a prerequisite. Cell reselection criterion "R" defines a set of rules, including mobility state parameter scaling. For inter-frequency or inter-RAT, the priority of LTE frequency or inter-RAT frequency can be higher or lower than the current serving frequency, and "R" shall be performed differently, while SIB3 defines absolute priority for the current LTE RF carrier, and similarly, SIB5~8 define absolute priority for other RAT carriers. For intra-frequency, the (RSRP) cell-ranking criterion Rs for serving cell and Rn for neighboring cells is defined by:

serving: $Rs=Qmeas,s+Q\_hyst-Q\_offset-Q\_offset\_SCPTM$, and neighboring: $Rn=Qmeas,n-Q\_offset-Q\_offset\_SCPTM$.

Thus, for cell reselection, absolute priorities of different inter-carrier or inter-RAT frequencies may be provided to the UE in SI, or RRC Connection Release, or inherited by the UE from previously connected RAT at inter-RAT cell (re)selection. The prioritization among the frequencies which UE considers to be the highest priority frequency is left to UE implementation. The UE does not have absolute priority based on LF and HF, but only considers frequencies based on RATs or listed carrier frequencies The conventional paging schemes as discussed above gave more attention to beam-sweeping based paging in SA HF systems, rather than DC based systems. However, the beam-sweeping based paging schemes for inactive or idle UEs cause large overhead (thus inefficiency) in beam sweeping, signaling and power consumption. The previous paging methods discussed above, such as the LF assisted HF paging (e.g., LF MN+HF SN) mechanism, have improved efficiency. However, the LF assisted HF paging lack trigger mechanisms, e.g., by use of a policy or configuration, to trigger using LF assistance for HF paging. The LF assisted HF paging mechanism is also limited to the logical assistance process, without specifying a policy that can be applied not only in paging, but also in various other scenarios, such as scanning, cell selection or reselection.

Indeed, since LF MN's wide coverage compensates well the high-speed beam-formed HF connection in DC or MC, it would not be unreasonable to use the similar compensation mechanism in other operations in addition to paging, such as cell selection, and cell reselection. Processes for UE initial access, idle or inactive state mobility, transition from the RRC_Idle or inactive mode to RRC_Connected mode, the cell selection or reselection process, as defined in 3GPP TS 36.304 or 3GPP TS 38.304, face the same inefficiency of beam sweeping, especially when HF cells are deployed and to be scanned. However, as discussed above, in the cell (re-)selection processes specified by 3GPP TS 36.304 and 38.304, prioritization between different frequencies or RATs is provided to a UE by system information (e.g., SIB3, and SIB5~8 in LTE) or dedicated signaling, but not used in the cell selection process. For cell selection, RSRP and RSRQ are compared to a threshold to determine whether a cell is "selectable". For cell reselection, absolute priorities of inter-frequency or inter-RAT carriers are defined in SI, in RRC, or by inheritance.

The beam-sweeping based NR paging schemes (such as the Options 1-4, and their enhancements) are limited to NR SA scenarios, have high beam sweeping and signaling overhead, and do not cover the NSA (e.g., EN-DC) or SA (e.g., NR-NR DC) scenarios, where the (wide-beam or LF) paging in a main cell may assist the (narrow-beam or HF) paging design in a secondary cell. A beam-sweeping based NR paging scheme, be it direct paging or group paging, cannot avoid the high overhead of beam sweeping or beam alignment when a being-paged UE has to receive the paging signals or has to transmit the UL response or RACH message. Wide-beam (or LF) paging and connection setup may replace the blind beam-sweeping and DL synchronization associated with standalone (HF) paging and data connection setup paths in a DC-capable system. DL paging and UL paging response may be paired and carried opportunistically over different (LF or HF) channels and carriers, or through asymmetric (DL vs. UL) paths in a DC-capable system. LF paging, camping and HF cell (re)selection may be harmonized in a LF+HF DC and Multi-Connectivity (MC) based system, but there is no existing policy or scheme to do so.

In particular, none of the above discussed methods or mechanisms have a uniform policy to coordinate paging and other operations, such as cell selection and reselection, across layers of MN-SN cell coverage or LF-HF deployments. There is no policy or configuration specifying absolute priorities between LF and HF, or between an MN and SNs for performing paging or other operations.

The embodiments presented in the following provide a uniform policy for hierarchically performing various operations, such as paging, page monitoring, channel scanning, cell (re)selection, and execution of the policy. The policy may also be referred to as a rule, a configuration, or a criterion. In the following, an operation may be a network side operation, such as downlink paging, downlink synchronization, or data radio bearer (DRB) or signaling radio bearer (SRB) establishment, etc., or a UE side operation, such as page monitoring, paging (e.g., uplink paging), cell selection triggered by paging (e.g., when a UE needs to conduct a cell selection associated with idle mode mobility, or when the UE needs to scan frequency carriers or channels in paging opportunities), cell reselection triggered by paging (with similar examples as for cell selection), etc. The policy may specify an absolute priority hierarchy of two sets of frequencies or two sets of transmission channels (e.g., paging channels). In the following description, the term of "set" refers to a set of frequencies or a set of transmission channels. Distinction will be provided when needed. The "transmission channel" may also be referred to as "channel". A transmission channel may be associated with a set of parameters, such as a time resource, a frequency resource, a carrier frequency, beam(s), code(s), transmission power, or specific node(s) (e.g., a MN or a SN). One set always has a higher priority than the other set, and the set having the higher priority will be used firstly for performing an operation before the other set is used next (if needed). That is, one set has an absolute higher priority than the other one. Each set may include one or more frequencies, or one or more channels. The two sets are also referred to as the first set and the second set in the following, for the purposes of illustration convenience only. The use of the "first" and the "second" should not be interpreted as defining an order of using the two sets of frequencies or channels, or defining values related to the two sets of frequencies or channels.

The policy may be defined by service providers or standardized, and applied to a DC, MC, or CA based communications system. The policy may be predetermined (e.g., hardcoded), pre-configured, or dynamically configured and reconfigured (e.g., by signaling). The policy may also be defined by a core network device, and signaled to base stations and UEs. The policy may also be defined by a master node (e.g., a macro base station) and signaled to secondary nodes (e.g., small cell base stations or TRPs) and UEs. In particular, the priorities assigned to the two sets may be predetermined or dynamically configured. Various policies may be defined based on frequencies or channels available for use, and criteria for prioritizing the frequencies or channels. The priorities assigned to the first set and the second set may be determined according to various criteria based on various factors, such as bandwidth, beamwidth, beam sweeping pattern, scanning latency, channel quality (e.g., penetration, transmission power, etc.), coverage, power level, load, unlicensed frequency band (carrier or BWP) or licensed frequency band, cost (e.g., a carrier vs. a BWP), a MN or a SN, etc. In one embodiment, frequencies or channels usable in a communications system may be grouped into the first set and the second set, which are assigned with different priorities according to the criteria.

The following description uses the policy specifying an absolute priority hierarchy of two sets of frequencies as an illustrative example, and it is also applicable to the case of two sets of channels where each channel is associated with one or more frequencies. In some embodiments, a criteria (or goal) assigns a higher priority to a set if utilization of the set in performing the operation involves less operation overhead, such as less signaling overhead, less latency, less power consumption, less cost, than the other set. For example, frequencies not requiring beamforming (e.g., omni-directional or quasi omni-directional or non-beamformed frequencies) are assigned a higher priority than frequencies requiring beamforming (e.g., beamformed frequencies). In this case, if the communications system is operable at multiple frequencies, then the non-beamformed frequencies may be grouped into the first set (or second set) and assigned with a higher priority, and the beamformed frequencies may be grouped into the second set (or the first set) and assigned a lower priority. In the case of channels, channels associated with non-beamformed frequencies may be grouped into the first set (or second set) and assigned with a higher priority, and channels associated with the beamformed frequencies may be grouped into the second set (or the first set) and assigned a lower priority. In another example, frequencies in the frequency range 1 of sub-6 GHz, i.e., LF, may be assigned a higher priority than frequencies in the frequency range 2 (e.g., mmWave frequencies), i.e., HF or higher frequencies. Then the frequencies in the frequency range 1 will be used first according to the policy. In yet another example, if both the first set and the second set are (or associated with) beamformed frequencies, but the beamformed frequencies have different beam sweeping patterns or different beamwidth, then the set that has a lower scanning latency may have a higher priority, or alternatively, the set having a wider beamwidth may have a higher priority. In this case, because the two sets have different beam sweeping patterns or different beamwidths, communications using the two sets may result in different overheads in paging, signaling, or scanning. According to the criteria, the one that has less overhead is preferred to be used first than the other one, and is thus assigned a higher priority.

In one embodiment, a frequency that is used by an MN may be assigned a higher priority than that used by an SN of (or associated with) the MN. In the case of channels, a channel associated with an MN may be assigned a higher priority than that associated with an SN that is associated with the MN. In another embodiment, a frequency that is used by an SN of an MN may be assigned a higher priority than that used by an SN of the MN. In another embodiment, a frequency that is less loaded may be assigned with a higher priority than a more crowed frequency. In yet another embodiment, a frequency that is less costly (e.g., by licensing fee) may be assigned with a higher priority than that a more expensive frequency. In yet another embodiment, a frequency that is in an unlicensed frequency band may be assigned with a higher priority than that in a licensed frequency band. In yet another embodiment, a frequency that has a better quality (e.g., channel quality, penetration, transmission power, interference level, etc.) may be assigned with a higher priority than that having a poor quality. Any other criteria may also be applicable for assigning different priorities to the two sets of frequencies.

According to the policy, the frequency (e.g., f1) with a higher priority will be utilized first before the frequency with a lower priority (e.g., f2). When f2 should be utilized may be determined based on whether a defined criterion is satisfied, such as an event occurs or a threshold is met. For example, if f1 is utilized for paging a UE before f2 is utilized, and a paging response is received before a timer expires (a criterion is not satisfied), then paging the UE utilizing f2 is not needed. Otherwise, when no paging response is received before the timer expires, f2 may be used to page the UE. In yet another example, if f1 is utilized for paging a UE before f2, and then depending on the information carried in the f1 paging, f2 may be used to send back the paging response or f2 may be used to do the follow-up paging. Various criteria may be made, e.g., depending on application scenarios. Similarly, the channel (e.g., c1) with a higher priority will be utilized first before the channel (e.g., c2) with a lower priority. When c2 should be utilized may be determined based on whether a defined criterion is satisfied, such as an event occurs or a threshold is met.

The policy in the following example embodiments is specifically referred to as a "MN or LF-first, and hierarchically SN or HF-second" policy, merely for illustrative purposes. The policy may also be referred to a "LF-first-then-HF" policy or a "MN-first-then-SN" policy. In the "LF-first-then-HF" policy, one set of frequencies is LF, and the other set is HF, or, one set of frequencies include frequencies used by an MN (LF), and the other set include frequencies used by SNs of the MN (HF). The terms of "LF" and "HF" are used to merely indicate that the LF is lower than the HF, and are not used to limit the involved frequencies to any particular frequency bands. For example, one set includes a LTE LF and the other set includes a NR HF. In another example, one set includes a NR LF, and the other set includes a NR HF. The following example embodiments are presented in a communications system including an MN and multiple SNs of the MN, where the MN is associated with LFs and the SNs are associated with HFs compared with the MN.

The "MN-first-then-SN" policy specifies that a first set of channels has absolute higher priority than a second set of channels. The first set of channels includes one or more master channels associated with an MN, and the second set of channels includes one or more secondary channels associated with a SN associated with the MN. The first set of channels is used for paging a UE before the second set of channels. The first set of channels is also used first by a UE for scanning, cell selection or reselection before the usage of the second set of channels.

Those of ordinary skill in the art would recognize that the example embodiments may also be applied to communications systems without MN and/or SNs. For example, the example embodiments may be applied to a base station that supports carrier aggregation using a LF and a HF. The following embodiments may also be applied to other policies as described above, which requires one of two sets of frequencies to be used first, and the other one of the two sets of frequencies to be used second hierarchically.

In the following example embodiments, the MN or its core network operator may act as both a policy controller and policy executor, and each SN of the MN and UEs act as policy executors. A policy controller may mandate the policy executors to execute the configured policy, that is, perform an operation using one set of frequencies with a higher priority first, and then using the other set of frequencies, if necessary. The policy controller may dynamically adjust the policy (frequencies in each set and/or priorities of the two sets) based on various factors, such as load status, a reuse factor, the bandwidth of the frequency band involved, or license sharing states, to name a few, and mandate the policy executors to execute the adjusted policy.

Figure 9:
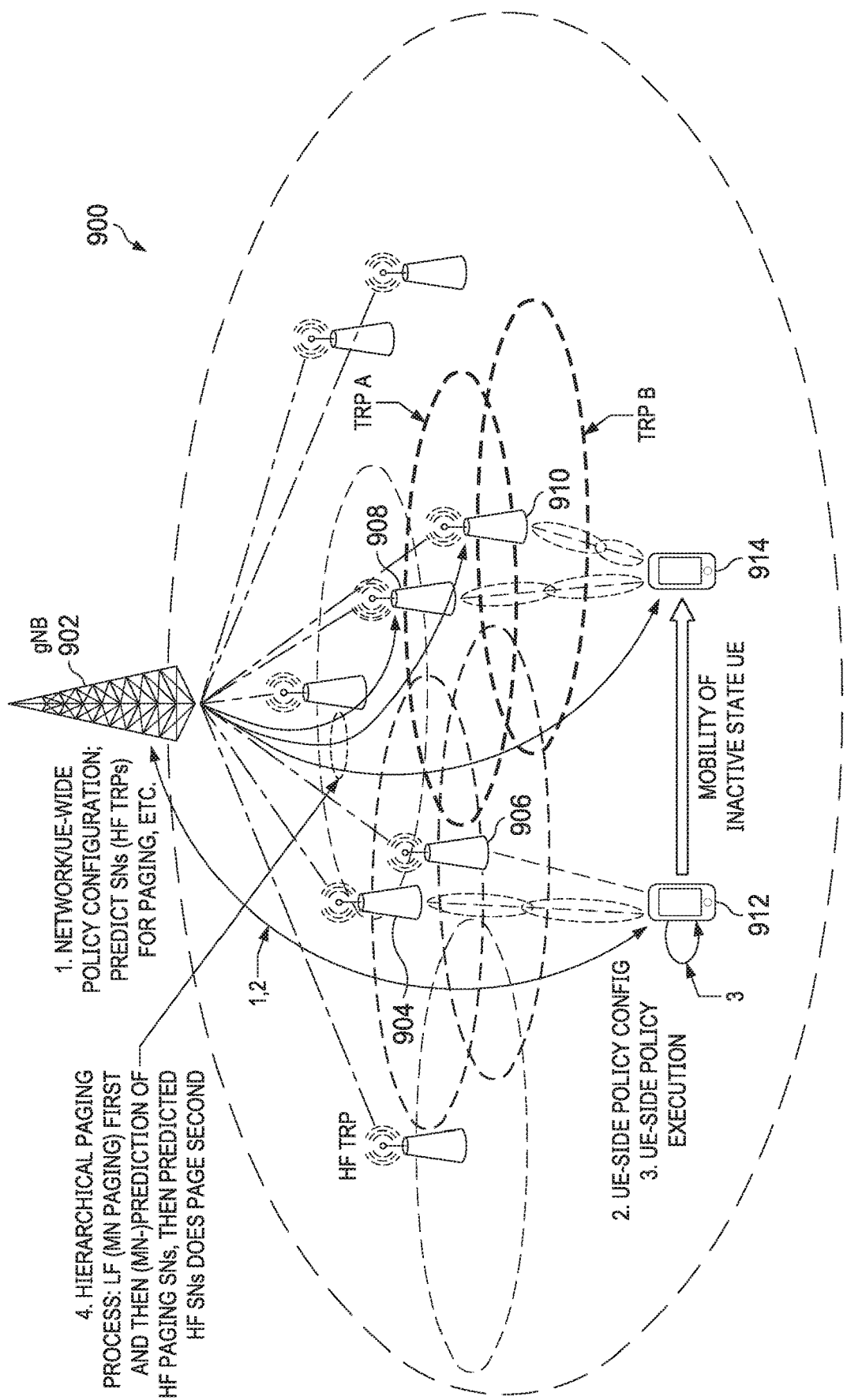
FIG. 9 illustrates a diagram of an embodiment communications system highlighting configuration and execution of a policy "MN or LF-first, hierarchically SN or HF-second"

FIG. 9 illustrates a diagram of an embodiment communications system 900. FIG. 9 highlights configuration and execution of a uniform policy "MN or LF-first, hierarchically SN or HF-second" for hierarchically performing downlink paging, downlink scanning, UE side cell (re)selection and uplink TAU or RAU. The communications system 900 includes a main channel served by a gNB 902 and a second channel served by TRPs, such as TRPs 904, 906, 908 and 910. The gNB 902 is the MN operable at LF, and the TRPs are SNs operable at HFs. The communications system 900 also includes a UE 912 that is served by the gNB 902. The UE 912 is a mobile and moves around in the coverage area of the gNB 902, and may move into coverage areas of different TRPs. The UE 912 may be served by TRPs 904 and 906 at a point of time, and after UE 912 moves around, it becomes served by TRPs A and B (TRPs 908 and 910), where the UE 912 is now referred to as UE 914 to avoid confusion. The UE 912 is shown to be in an inactive state, and moves around. The UE 912 may also be in an idle state.

The gNB 902 may perform network side and UE side policy configuration (step 1 and step 2). The gNB 902 may exchange signaling with the UE 912 to configure the UE with the policy. In one example, the gNB 902 may transmit information of the policy to the UE 912 and instruct the UE 912 to execute the policy. The UE 912 receives the information of the policy and the instruction, and perform policy configuration at the UE side. If the UE 912 has had the policy (e.g., hardcoded), the gNB 902 may send an instruction to instruct the UE 912 to execute the policy. The gNB 902 may receive the information of the policy from a core network device and perform policy configuration at the base station side. Alternatively, the gNB 902 may be configured with the policy by an operator. In addition, the gNB 902 may predict (or determine) a set of SNs (i.e., HF TRPs) from the SNs in the gNB 902's coverage for paging the UE 912 according to the policy, where HF is utilized after LF.

The UE 912 may then execute the configured policy when performing one or more operations, such as page monitoring, cell (re)selection, uplink paging, uplink TAU or RAU (step 3). For example, the UE 912, when in the RRC_Inactive state or the RRC-Idle state, may monitor the LF first for paging, and then monitor the HF for paging. A hierarchical paging process from the network side according to the policy may include the gNB 902 paging the UE 914 using LF paging first (or MN paging first), predicting or determining (by the MN) HF paging SNs (i.e., predicting SNs for HF paging), and the predicted SNs paging the UE 914 using HF paging (step 4). As used herein, LF paging is referred to as paging using an LF channel, and HF is referred to as paging using an HF channel. The gNB 902 may instruct the predicted SNs, such as TRP A and TRP B to page the UE 914 in HF, and the TRP A and TRP B page the UE 914, respectively.

The contents of the various messages sent by the gNB 902, the TRPs and the UE 912-914, as well as the ordering of the various messages, may be changed (e.g., swapped, removed, combined, reordered, enhanced, configured, and so on) in different embodiments without changing the example embodiments presented herein. The TRPs and gNB may be physically collocated as a single network device. In different embodiments, some of the steps 1-4 may be skipped or combined, or performed in different orders than that is shown in FIG. 9. As an illustrative example, the gNB 902 may predict or determine (including select or configure) the SNs before LF paging the UE 914.

Figure 10:
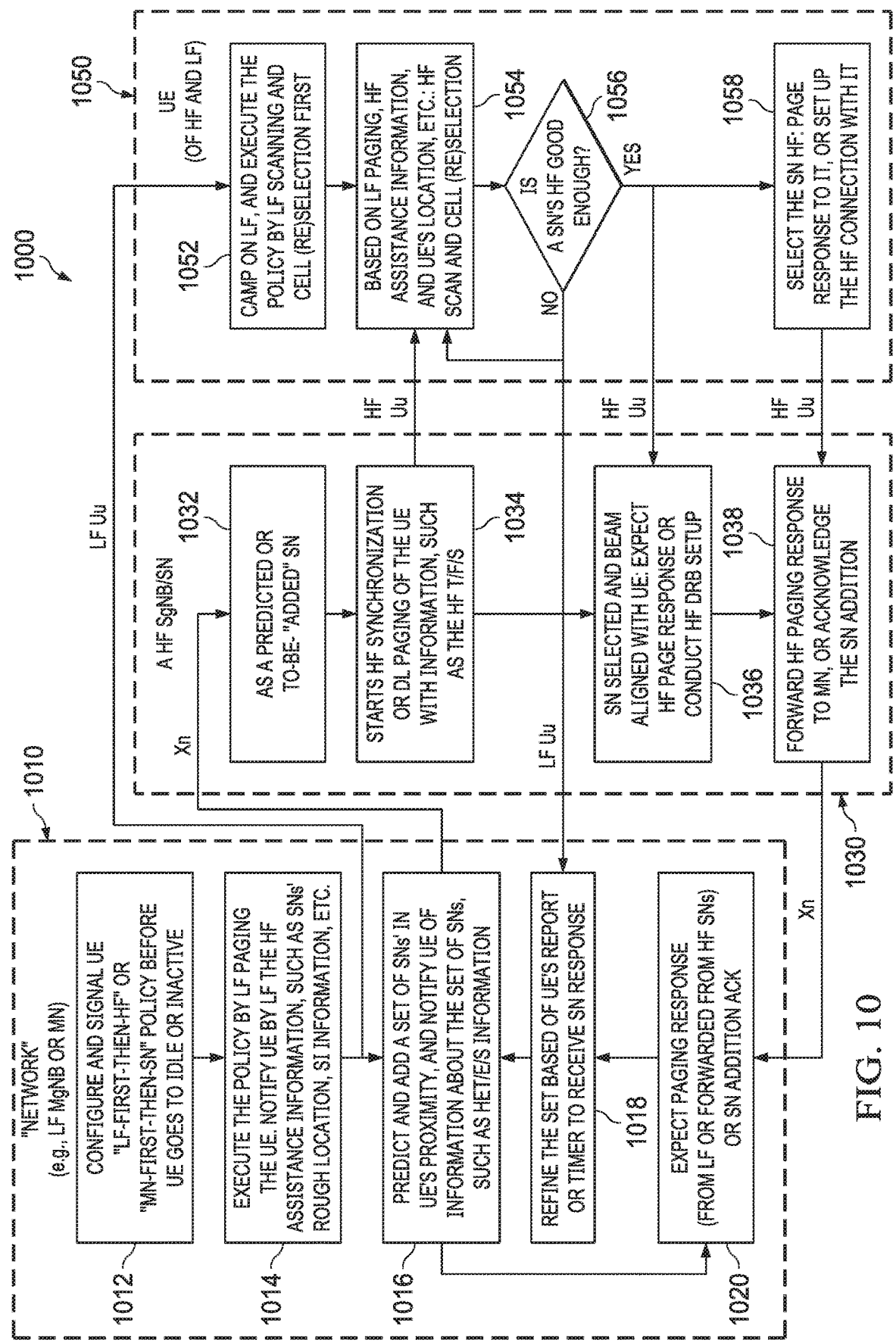
FIG. 10 illustrates a diagram of an embodiment method for LF-assisted-HF-paging according to the policy "MN or LF-first, hierarchically SN or HF-second"

FIG. 10 illustrates a diagram of an embodiment method 1000 for LF-assisted-HF-paging according to the "MN or LF-first, hierarchically SN or HF-second" policy, highlighting behaviors of participating communication devices. The policy may be used for paging, scanning and cell (re) selection. FIG. 10 shows behaviors of and interactions between a first network node 1010, a second network node 1030 and a UE 1050. The first network node 1010 may be a LF MN, such as a LF MgNB, or a core network node. The second network node 1030 may be a HF SN, such as a SgNB. The UE 1010 supports NR LF and NR HF DC, and is in the RRC_Inactive state. The first network node 1010 pages the UE 1050 (in the inactive state) in a RAN-based paging process, and the first network node 1010 (MN) knows the topology of SNs that are in its control.

In this example, the LF-assisted HF paging scheme is used for paging the UE 1050, and the conventional DC SgNB addition scheme is used for notifying the second network node 1030 to page the UE 1050 in HF. A first-level coarse LF layer paging will be performed first by the first network node 1010 in a paging process for paging the UE 1050, and then a second-level finer-granularity HF layer under LF's assistance is used to refine or speed up the paging process, or to set up a HF connection with the UE 1050.

The first network node 1010 may configure and signal the "LF-first-then-HF" policy or "MN-first-then-SN" policy before the UE 1050 enters the inactive (or idle) state (step 1012). The first network node 1010 may signal the policy to the UE 1050, and or other SNs, such as the second network node 1030, and instruct the UE 1050 and the SNs to execute the policy. The first network node 1010 may execute the policy by LF paging the UE 1050 (step 1014). After LF paging the UE 1050, the first network node 1010 may instruct to HF page the UE 1050 according to the policy. While paging the UE 1050 using LF, the first network node 1010 may notify the UE 1050, using LF, of HF assistance information. The HF assistance information may include rough location or beam direction information of one or more SNs which are, e.g., in a TA or RA, or in the coverage area of the MN, synchronization information of the one or more SNs, such as time or frequency or code resources, or rough HF beam directions over which the downlink synchronization signals from the SN(s) are transmitted to the UE, or vice versa, i.e., HF beam directions over which the uplink synchronization signals from the UE are transmitted to the SN(s), or HF paging information of the one or more SNs such as paging TRP information (e.g., ID, scrambling code, and so on), paging schedule, beam ID or direction. The HF assistance information may provide useful information for the UE 1050 to monitor HF pages. The first network node 1010 may transmit the HF assistance information to the UE 1050, e.g., over the LF Uu interface.

The first network node 1010 may predict and add a set of SNs' that are in the proximity of the UE 1050, such as the second network node 1030, and notify the UE 1050 of information, such as HF paging time, code, frequency, beam, and other scheduling information, about the predicted SNs (step 1016). The first network node 1010 may provide, to the UE 1050, information about a paging configuration, scheduling, content, space, time, frequency and code resources, and so on, for HF paging by the set of SNs 1030. As an example, paging configuration information (such as paging cycles carried in minimum or additional system information or UE specific RRC dedicated configuration, and so on), scheduling information (such as time of PF, time of PO, time of SS bursts, time of blocks, time of DRX ON, predicted beam directions, resources of RACH, resources of AU, resources of page response, and so forth), content information (such as paging ID, cause code such as downlink data availability for services in secondary channel, etc.), and so on, is signaled by the first network node 1010 over an LF channel for paging the UE 1050, where the paging will be performed by the set of SNs 1030.

The first network node 1010 may refine the set of SNs that is predicted or determined or selected based on reports (or feedback) of the UE 1050, or based on the time expectedly taken for the network node 1010 to receive a paging response from one of the set of SNs (step 1018), where the paging response may be generated by the UE 1050 but forwarded by the SNs 1030. The reports may be received from the UE 1050 over the interface LF Uu. The first network node 1010 may update the predicted set of SNs (at step 1016), and notify the updated set of SNs. In the case that the second network node 1030 is one of the predicted SNs, the first network node 1010 may notify the second network node 1030, e.g., over an interface Xn, that the second network node 1030 is a predicted or selected SN or "to-be-added" SN that may be used for HF paging the UE 1050. In this case, the first network node 1010 may send a request (e.g., a secondary node addition request), such as a SgNB addition request, to the second network node 1030, requesting allocation of resources for HF paging by the SgNB/SN 1030.

The first network node 1010 may expect to receive a paging response directly from the UE in LF, receive a paging response that is forwarded from one of the set of SNs over an Xn interface or an HF channel, or receive an SN addition acknowledgement message from an SN of the set of SNs, when a SN addition request is sent to the SN (step 1020). Based on the receipt of the paging response, etc., the first network node 1010 may refine update the set of predicted SNs.

The second network node 1030 may receive signaling from the first network node 1010, which notifies that the second network node 1030 is a predicted SN or "to-be-added" SN that may be used for HF paging the UE 1050 (step 1032). When HF paging the UE 1050 is needed, or HF connection setup with the UE 1050 is needed, the second network node 1030 may start HF synchronization or downlink paging the UE 1050, using the assisted information, such as the information about the HF schedule of synchronization or paging in power, time, frequency, space, or code (step 1034). When the second network node 1030 is selected by the UE 1050, e.g., during a cell (re)selection process, and is beam aligned with the UE 1050, the second network node 1050 may expect to receive an HF page response from the UE 1050, or may conduct HF DRB setup with the UE 1050 (step 1036). The second network node 1050 may exchange signaling with the UE 1050 over an interface HF Uu. The second network node 1050 may forward the received HF page response to the first network node 1010, or acknowledge the SN addition over the interface Xn between the MN and the SN (step 1038). At this step, the second network node 1050 may also exchange signaling with the UE 1050, such as receiving HF paging response, over the interface HF Uu.

By following the policy, the UE 1050 may initially camp on LF with the first network node 1010, and execute the remaining of the policy by performing LF scanning (e.g., monitoring LF page) and/or LF cell (re)selection first (step 1052). When the UE 1050 enters the idle or inactive state, the UE 1050 may, according to the policy, monitor LF pages first, and then monitor HF pages, e.g., upon a criterion is satisfied, such as when a timer expires without detecting LF pages. When cell selection or reselection is needed, the UE 1050 may, according to the policy, scan LF cells, and then scan HF cells, e.g., upon a criterion is satisfied, such as when a timer expires. The UE 1050 may receive, from the first network node 1010, a LF paging message and also the assistance information about the HF channel (e.g., the information sent by the first network node 1010 at step 1014), and perform HF scanning (i.e., HF synchronization or page monitoring), and/or cell (re)selection based on the UE's location and the assistance information (step 1054). For example, the UE may monitor HF pages from the selected one or more SNs, and/or perform cell selection or reselection from the selected one or more SNs. The UE 1050 may determine whether the HF channel of a SN that is scanned during the cell (re)selection process is of a good enough signal quality (step 1056), and when the HF channel of the SN is good, the UE 1050 may select the HF SN as a potential serving node, and send a page response (or AU) to the SN, or set up the HF connection with the SN (step 1058). The UE 1050 may exchange signaling with the second network node 1030 in the interface HF Uu, such as transmitting a page response to the second network node 1030 in HF, and establish HF DRB with the second network node 1030.

The order of various actions performed by the first network node 1010, the second network node 1030 and the UE 1050, such paging or scanning, cell (re-)selection, paging responding in LF or HF, and SgNB addition acknowledging, may be changed (e.g., swapped, reordered, combined, or enhanced) in different embodiments. For example, the second network node 1030 may respond with the SN addition acknowledgement to the MN 1010 before it pages the UE 1050 in HF.

The contents of the various blocks performed by the first network node 1010, the second network node 1030 and the UE 1050, as well as the ordering of the various blocks, may be changed (e.g., swapped, removed, reordered, combined, enhanced, configured, and so on) in different embodiments without changing the example embodiments presented herein. In different embodiments, some of the blocks, such as policy configuration, SN prediction, may be revised, skipped or combined, or performed in different orders than that is shown in FIG. 10. As an illustrative example, the first network node may not configure the policy (step 1012), or may not predict the set of SNs (step 1016).

Although the method 1000 is described with the UE 1050 in the inactive state (for RAN-based paging), the method 1000 may also be applied to CN-based paging, where the UE 1050 is in the RRC_Idle state. In this case, where the UE 1050 is in the RRC_Idle state, CN-base paging will be employed to page the UE 1050. The first network node (i.e., the CN) may first predict or select a set of MNs, and forward paging messages to the set of MNs. The CN knows at least the MNs topology. One of the MNs may then be selected to execute the policy as shown in the steps 1012-1020. In this case, the CN may not notify SNs directly for paging UE, but only notify them through the selected MN. Alternatively, the CN may page the UE (at the NAS layer as in LTE) through the selected MN through a Uu interface. The policy in this case may be referred to as "MN-first-then-SNs".

In some embodiments, each LF MN's in a TA or RNA may adopt a network-side policy in paging specifying an absolute LF-HF prioritization, where LF has an (absolute) higher priority than HF, and is used before the HF in paging a UE. Each MN, whether it is configured to operate in dual band (e.g., in an LF band and a HF band), may always try to page a UE using LF first before HF. An MN may enable HF paging as needed, e.g., when HF cells offer coverage extension to the MN's LF cell, or when HF connection setup is needed. An MN may first operate at the LF layer, i.e., perform LF paging, and then operate at the HF layer. At the LF layer, the MN may follow the policy to page a UE, e.g., directly or through a small group of HF SN's under the MN's master control or LF coverage. Then at the HF layer, the HF SNs' may continue the page or pursue connection setup with LF assistance, as discussed above.

In the case of CN-based paging, a CN may predict a first list of LF MNs in a signal or geographical proximity to a UE that is to be paged in a TA. The first list of LF MNs may include one or a subset of LF MNs in the tracking area. Thus, less LF MNs may be involved in paging the UE. In this case, only a second list of MN(s), that has heard a LF page response or AU from the UE and that may not be the same as the first list of the LF MNs, may need to trigger one or more SNs that are under control (as described in the case of DC or in FIG. 10), where the (second list of) MN(s), as 1010, may conduct HF paging on the UE or connection setup with the UE, as needed, directly (if LF and HF channels are collocated with the MNs), or through the associated SNs. The CN or each of the second list of MN(s) may signal only a list of SN(s) (that is predicted or determined), over backhaul, information about the UE (e.g., by S1 or NG-C interface). This avoids involving all SNs to page or to set up HF connection, and reduces signaling overhead. In CN or RAN-based paging, only the listed of MN(s) needs to predict their respective lists of SN(s) under their control and at the UE's proximity. The list of MN(s) may signal, to the UE in LF, information about the predicted SNs, instead of all SNs in the TA/RNA. This further facilitates LF assisted HF paging by the predicted SNs of the UE or HF connection setup between the UE and one of the predicted SNs.

An inactive or idle UE may adopt a UE-side policy specifying an absolute LF-HF prioritization in various operations, such as camping, scanning, cell (re)selection, or page monitoring. According to this UE-side policy, LF may be always used and tried first before HF in a UE-side operation, such as page monitoring. The UE may always scan LF first for synchronization sequences and paging messages before it tries (to scan) HF. The UE may then scan the reduced list of HF SNs, e.g., as predicted by MN(s), for HF synchronization and page monitoring. According to the UE-side policy, HF RACH may be performed under LF assistance.

When the UE detects a paging message, the UE may respond to the page with a paging response, or performs RACH to potential paging MNs (for CN-based, which are a smaller number of MNs in all possible MNs) or potential paging SNs (which are a smaller number of SNs in all possible SNs). These potential paging MNs or SNs followed a CN or an MN's instruction to HF page the UE, uses the reserved HF RACH resources, etc., when the UE's mobility makes a quick or accurate HF beam alignment to any specific SN difficult.

The above network-side policy or UE-side policy may be adopted or managed in different embodiments. For example, the policy may be implemented within a specific public land mobile network (PLMN), for a radio access technology (RAT) or a frequency carrier, or across multiple PLMNs, or RATs, or frequency carriers. The policy may be applied for a CN to predict a list of MNs, or for an MN to predict a list of SNs. The policy may be hardcoded at a UE and a network device, or coordinated between them, e.g., by configuration signaling. The policy may be implemented in any combined manner as discussed herein.

The embodiments provide prioritized hierarchical paging by frequency and by coverage. Comparatively, R13 LTE paging (3GPP TS 36.304) may be performed through a prioritized frequency list by RATs, PLMNs, for frequency carriers, but not by frequency of beamforming requirements (e.g., LF vs. HF) or by coverage (e.g., a wide coverage without the need of BF vs. a narrow coverage with beam sweeping as a necessity), etc.

The embodiments also provide actions at the network-side and the UE-side to enable the hierarchical paging. Taking the R13 LTE paging (3GPP TS36.304) as an example, S1 message in CN may be responded by eNBs, or S1 message may be a container of the NAS paging message that is to be page responded by the UE at the NAS layer. Regardless of the page response message format, the policy-based scheme works.

The embodiments further provide messaging enabling the hierarchical paging. Taking LTE DC or EN-DC as an example, there is information (e.g., SIB2 or SIB1) that includes information for paging (e.g., RACH using specific preambles). However, there is no complete policy-based assistance information about HF paging opportunities (e.g., RACH, opportunities, directions, preambles), and the RACH preambles therein are not different than the normal RACH preambles.

Figure 11:
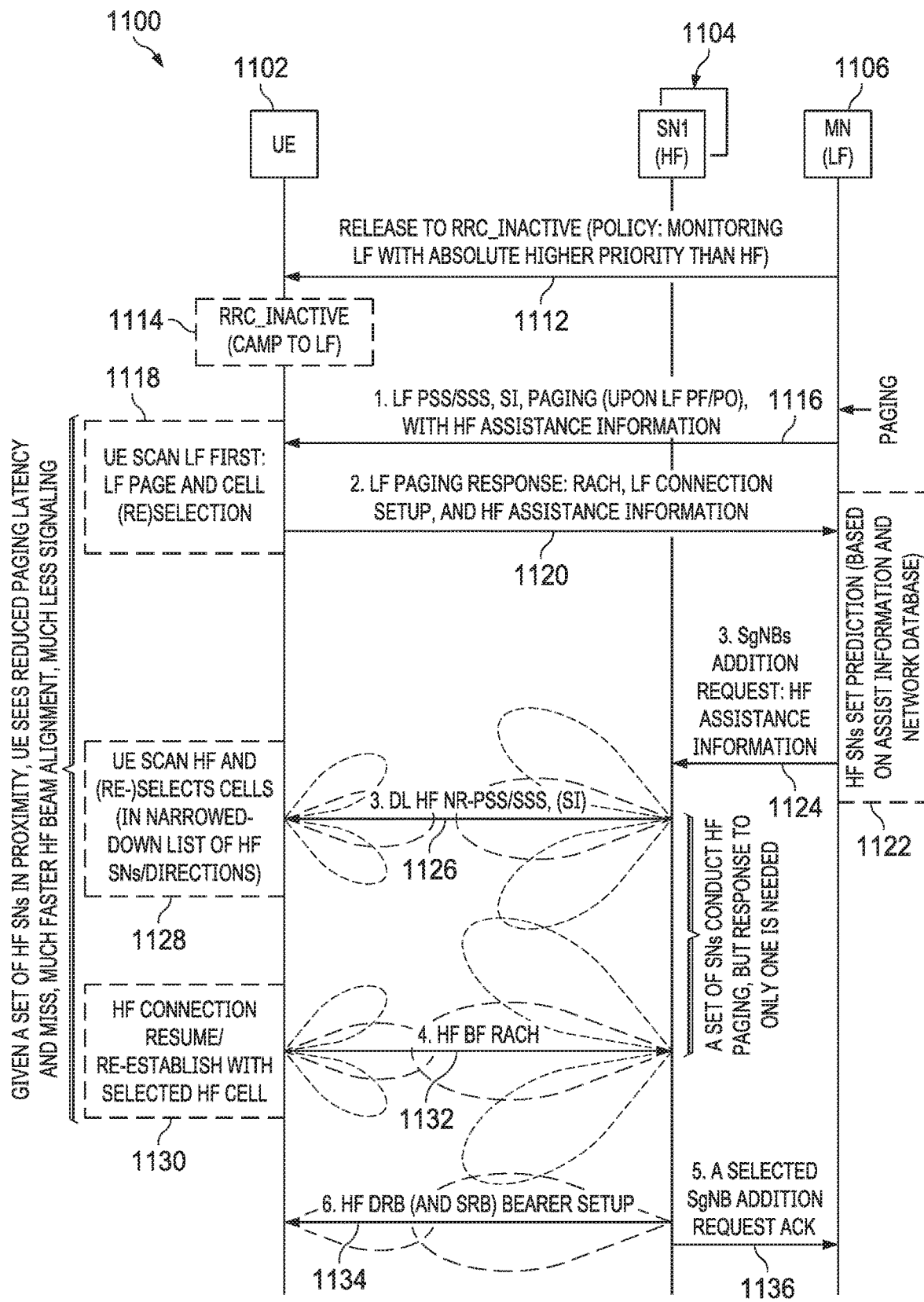
FIG. 11 illustrates a diagram of an embodiment method for LF-assisted paging according to the policy of "MN or LF-first, and hierarchically SN or HF-second"

FIG. 11 illustrates a diagram of an embodiment method 1100 for LF-assisted paging performed according to the policy of "MN or LF-first, and hierarchically SN or HF-second", highlighting interactions between communication devices. FIG. 11 shows communications performed by a UE 1102, an SN 1104 (configured to operate in HF), i.e., SN1, and an MN 1106 (configured to operate in LF). In this example, the UE 1102 is paged using the LF-assisted paging scheme as discussed previously. The SN 1104 and the MN 1106 page the UE 1102 according to the policy, and the UE 1102 monitors pages, and performs scanning and cell reselection according to the policy. It is noted that there may be multiple SNs operable in LF and performing similarly to SN1 1104. In this example, the LF-assisted paging is enhanced by the MN 1106 predicting HF SNs in the UE 1102's proximity, multiple SNs paging the UE 1102 and the UE 1102 performing LF-first cell (re)selection, with specific SgNB addition request acknowledgement communicated. With the policy configured and implemented, the UE is hierarchically paged according to the absolute prioritization between the LF and the HF.

At step 1112, the MN 1106 may send a "Release to RRC_Inactive" message to the UE 1102. Before the step 1112, the MN 1106 may have configured the UE 1102 with the policy, which instructs the UE 1102 to monitor LF with an absolute higher priority than HF. The MN 1106 may signal the policy to the UE 1102, informing the UE 1102 that LF has an absolute higher priority than HF. Thus, the UE 1102 may monitor or scan LF for paging or cell reselection before HF. At step 1114, the UE 1102 enters the RRC_Inactive state. It is noted that before the UE 1102 enters the RRC_Inactive state, it camped to LF (i.e., it camped to the MN 1106 in LF).

At step 1116, when there is a need to page the UE 1102, the MN 1106 sends paging related information in LF to the UE 1102. The paging related information may include an LF primary synchronization signal (PSS), a secondary synchronization signal (SSS), system information (SI), and a paging message in an LF PF or PO. The MN 1106 may also send HF assistance information, such as location information of one or more HF SNs that are in a TA or RA of the UE 1102 or in the coverage area of the MN, synchronization information of the one or more SNs, or HF paging information of the one or more SNs, such as paging TRP information (e.g., ID, scrambling code, and so on), paging schedule, beam ID or direction, for preparation of the UE 1102 to monitor HF pages by the one or more SNs.

At step 1118, after entering the RRC_Inactive state, the UE 1102 may scan the LF first for LF page monitoring and cell (re)selection according to the policy. When the UE 1102 detects the LF paging message from the MN 1106, at step 1120, it may send an LF paging response to the MN 1106. In response to the paging by the MN 1106, the UE 1102 may send a paging response message to the MN 1106, or initiate a RACH process by sending a RACH preamble to the MN 1106. The UE 1102 may then initiate an LF RRC connection setup procedure to set up LF RRC connection with the MN 1106. The UE 1102 may also send assistance information about the HF channel to the MN 1106, such as its location, HF channels, beam directions, or DRX, or traffic, or mobility information of the UE 1102, for preparation of being paged by one or more SNs in HF.

At step 1122, when HF paging the UE 1102 or HF connection setup with the UE 1102 is needed, for example, the MN 1106 may predict (or determine or select) a set of HF SNs, and then a SgNB/SN addition process, for example, may be initiated at step 1124 for each of the SNs in the set. The set of HF SNs to be added may HF page the UE 1102 or set up HF connection with the UE 1102, if needed. The MN 1106 may predict the set of HF SNs based on the assistance information, such as the HF assistance information sent by the UE 1102, the HF assistance information sent by the MN 1106 to the UE 1102 regarding SNs, and/or similar information from a network database that may be used in the prediction or selection process to determine the set of HF SNs.

At step 1124, the MN 1106 may send a SgNBs ADDITION REQUEST message (or similar messages) to the predicted SNs, such as the SN 1104. The SgNBs ADDITION REQUEST notifies predicted SNs to prepare for HF paging, such as allocating resources. The MN 1106 may also send HF assistance information, such as a location of the UE 1102, to the SN 1104, which facilitates the SN 1104 to page the UE 1102 or set up HF connection.

At step 1126, the SN 1104 may HF page the UE 1102. For example, the SN 1104 may send an HF NR-PSS, SSS, or SI to the UE 1102 in downlink. It is noted that each of the predicted SNs may HF page the UE 1102 similarly to the SN 1104 at the step 1126. That is, a set of SNs (i.e., the predicted SNs) conduct HF paging of the UE 1102 before one of them receives a response from the UE 1102. However, the UE 1102 may only need to respond to one page sent by one of the set of SNs.

At step 1128, the UE 1102 scans HF for pages or cell (re)selection according to the policy. Step 1128 may be performed after the LF is scanned with instructions about HF channel received, or when LF scanning failed, or a predefined criterion is satisfied, e.g., when the UE 1102 does not detect LF pages, or fails to (re)select an LF cell. Based on the HF assistance information sent by the MN 1106 at step 1116, for example, the UE 1102 may be able to perform the step 1128 in a narrowed-down list of HF SNs or directions (of beam-formed sweeping).

The UE 1102 may receive HF paging messages from the set of predicted SNs, and select one of the SNs. At step 1130, the UE 1102 may perform HF connection resume or re-establishment with the selected HF cell (SN) that was successfully synchronized with, scanned, or (re)selected at step 1128. Then the UE 1102 may initiate a RACH process with the SN 1104 at step 1132, and send a HF beamformed RACH message to the SN 1104. At step 1134, the SN 1104 may perform HF DRB (and SRB) setup for the UE 1102. At step 1136, the SN 1104 may send a selected SgNB an ADDITION REQUEST ACK message to the MN 1106, acknowledging the SgNBs ADDITION REQUEST from the MN 1106.

As used herein, the HF assistance information may include information about one or more HF SNs that are to page a UE. The information may be sent to the UE, which facilitates the UE to monitor, detect, respond to the pages from the one or more HF SNs and to establish HF connection with the one or more HF SNs. The HF assistance information may also include information about a UE to be paged, which facilitates one or more HF SNs to page the UE.

As shown in the example of FIG. 11, the MN 1106 uses the HF assistance information to predict a small set of HF SNs in the UE's proximity. Thus, only the small set of HF SNs is involved in HF paging the UE 1102. With the HF assistance information received from the MN 1106, the UE 1102 is provided with information of a set of HF SNs, for example, which is in the proximity of the UE 1102. The UE 1102 is thus able to experience reduced paging latencies and misses. This also allows the UE 1102 to achieve HF beam alignment faster with less signaling overhead. In this way, the example in FIG. 11 reduces paging misses, paging latencies and paging signaling overhead, and enables faster HF alignment or reduced power consumption.

When the example of FIG. 11 is applied for CN-based LF paging, only those LF MNs that have received paging responses from the UE may further page the UE or set up connection with the UE though the HF SNs. An LF MN that is responded by the UE or instructed by the CN may predict the set of HF SNs in the UE's proximity, e.g., based on UE-provided or CN-provided assistance information. Only the HF SNs in the predicted set of SNs are involved in further paging the UE by multiple HF SN. One HF SN may eventually set up a HF connection with the UE.

The contents of the various messages sent by the UE 1102, the SN 1104 and the MN 1106, as well as the ordering of the various messages and the various blocks, may be changed (e.g., swapped, removed, reordered, combined, enhanced, configured, and so on) in different embodiments without changing the example embodiments presented herein. For example, the step 1120 may be replaced by a step of sending an HF paging response by the UE 1102 (e.g., step 1132), in a sequential order with the step of sending an HF paging response (e.g., Step 1132) by the UE 1102, or followed by an HF connection setup only (e.g., saving the steps of 1126-1132).

Figure 12:
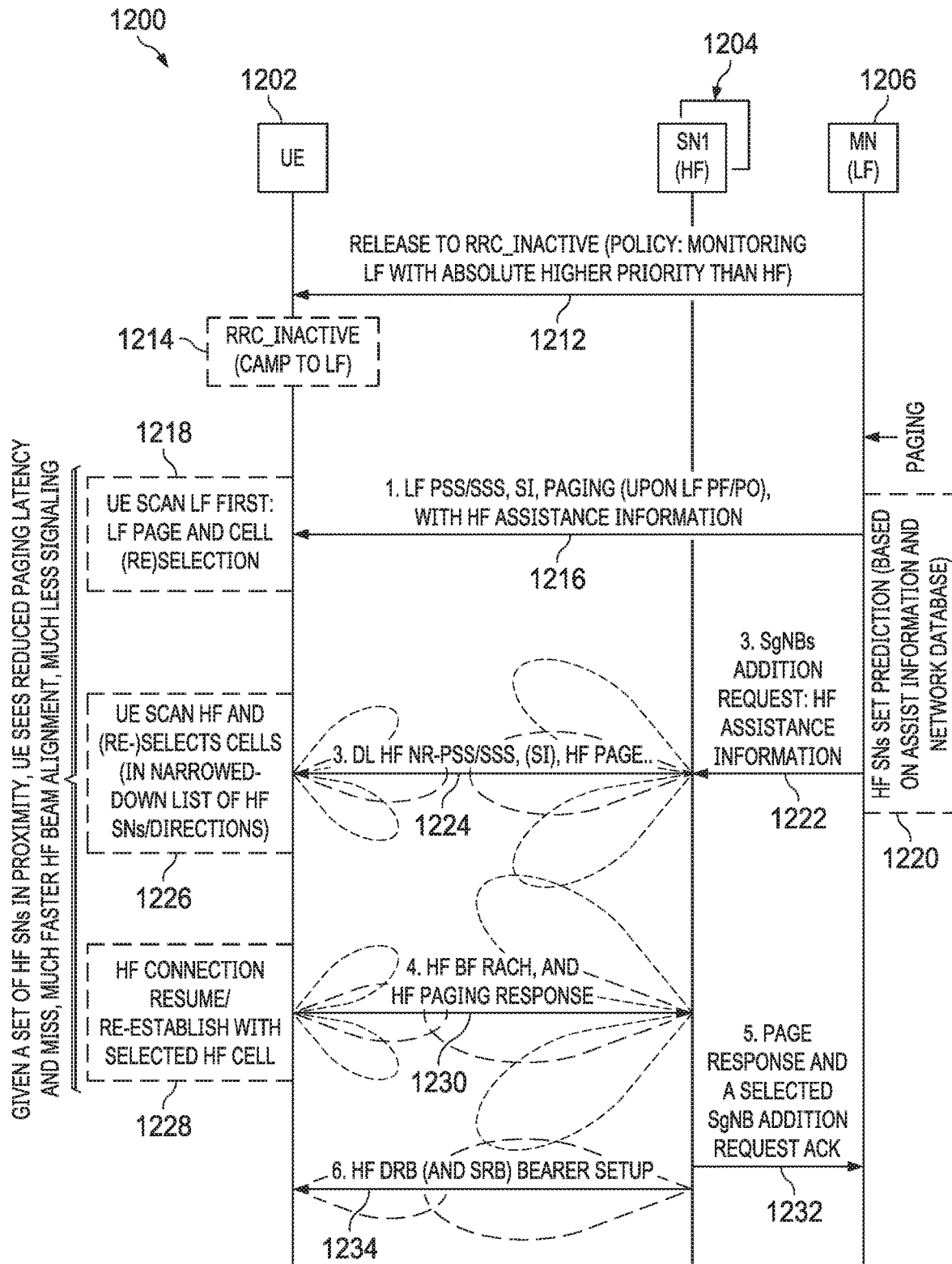
FIG. 12 illustrates a diagram of another embodiment method according to the policy of "MN or LF-first, and hierarchically SN or HF-second"

FIG. 12 illustrates a diagram of another embodiment method 1200 performed according to the policy of "MN or LF-first, and hierarchically SN or HF-second", highlighting interactions between participating communication devices. FIG. 12 shows communications performed by a UE 1202, an SN or a set of SNs 1204 (configured to operate in HF), e.g., SN1, and an MN 1206 (configured to operate in LF). It is noted that there may be multiple SNs operable in HF and performing similarly to SN1 1204.

As shown, at step 1212, the MN 1206 may send a "Release to RRC_Inactive" message to the UE 1202. Before the step 1212, the MN 1206 may have configured the UE 1202 with the policy, which instructs the UE 1202 to monitor LF with an absolute higher priority than HF. The MN 1206 may signal the policy to the UE 1202, informing the UE 1202 that LF has an absolute higher priority than HF. Thus, the UE 1202 may monitor or scan LF for paging or cell selection or reselection before HF. At step 1214, the UE 1202 enters the RRC_Inactive state. It is noted that before the UE 1202 enters the RRC_Inactive state, it camped to LF (i.e., it camped to the MN 1206 in LF).

At step 1216, when there is a need to page the UE 1202, the MN 1206 sends paging related information in LF to the UE 1202. The paging related information may include an LF PSS, a SSS, SI, and a paging message transmitted in an LF PF or PO. The MN 1206 may also send HF assistance information, such as location or beam direction information of one or more SNs that are in a TA or RNA of the UE 1202 or in the coverage area of the MN 1206.

At step 1218, after entering the RRC_Inactive state, the UE 1202 may scan the LF first for LF page monitoring and cell (re)selection according to the policy. While scanning, the UE 1202 may receive the paging message sent by the MN 1206 in LF.

At step 1220, the MN 1206 may predict (or determine or select) a set of HF SNs in compliance to the policy. The predicted set of HF SNs may be used to HF page the UE 1202 or set up HF connection with the UE 1202, if needed. The MN 1206 may predict the set of HF SNs based on assistance information, such as the HF assistance information sent by the UE 1102, the HF assistance information sent by the MN 1106 to the UE 1102 regarding SNs, and/or information from a network database that may be used in the prediction. The step 1220 may be started before, at the same time, or after the step 1216.

At step 1222, the MN 1206 may send a message, such as a SgNBs ADDITION REQUEST, to the predicted SNs, such as the SN(s) 1204. The SgNBs ADDITION REQUEST notifies predicted SNs to prepare for HF paging, such as allocating resources. The MN 1206 may also send HF assistance information, such as a location of the UE 1202, to the SN(s) 1204, which facilitates the SN(s) 1204 to page the UE 1202 or set up HF connection.

At step 1224, the SN(s) 1204 may HF page the UE 1202. For example, the SN 1104 may send an HF NR-PSS, SSS, SI, and an HF paging message to the UE 1202 in downlink. It is noted that each of the predicted SNs may HF page the UE 1202 similarly to the SN(s) 1204 at the step 1224. That is, a set of SNs (e.g., the predicted SNs) conduct HF paging of the UE 1102 before one of them receives a response.

At step 1226, the UE 1202 scans HF for pages or cell (re)selection according to the policy. Based on the simple HF assistance information sent by the MN 1206 at step 1216, the UE 1202 may be able to perform the step 1226 in a narrowed-down list of HF SNs or reduced spatial directions (e.g., in terms of beam-formed sweeping).

At step 1228, the UE 1202 may perform HF connection resume or re-establishment with the (re)selected HF cell (SN), such as the SN(s) 1204. At step 1230, when the UE 1202 selects the SN(s) 1204, for example, the UE 1202 may initiate a RACH process, and send a HF beamformed RACH message and an HF paging response (in response to the HF paging message sent at step 1224) to the SN(s) 1204. At step 1232, the SN(s) 1204 may send, to the MN 1206, a page response, and an SgNB Addition Request ACK message (which indicates that one of the SNs 1204 is one of the UE (re)selected HF SNs). At step 1234, the SN(s) 1204 performs HF DRB (and SRB) bearer setup with the UE 1202.

Both the method 1100 in FIG. 11 and the method 1200 in FIG. 12 are performed according to the policy of "MN or LF-first, and hierarchically SN or HF-second". The method 1200 also has the similar advantages, such as reduced paging misses, paging latencies and paging signaling overhead, faster HF alignment and reduced power consumption. However, in FIG. 11, the LF page is LF responded (step 1120) before the LF assisted HF connection setup is done (e.g., steps 1126-1132). While in FIG. 12, first-level LF paging is combined with the second-level HF paging, and only one paging response (step 1232) is used.

The contents of the various messages sent by the UE 1202, the SN(s) 1204 and the MN 1206, as well as the ordering of the various messages and the various blocks, may be changed (e.g., swapped, removed, reordered, combined, enhanced, configured, and so on) in different embodiments without changing the example embodiments presented herein. Some steps may be refined with different details or message contents.

FIG. 11 and FIG. 12 provide two embodiments for applying the policy of "MN or LF-first, and hierarchically SN or HF-second" to various operations, such as paging, paging monitoring, paging response, cell selection, or cell reselection. One of ordinary skill in the art would recognize various modifications, alternatives and variations for applying the policy in a communications system, such as a DC or MC based communications system of same-RAT, an inter-system, or an intra-system of inter-RAT.

FIG. 11 and FIG. 12 show that the MN (e.g., the MN 1106 or the MN 1206) may predict (or determine or select) a set of HF SNs (e.g., in the proximity of the UE), which may be directed to page the UE in HF. Information of the predicted set of HF SNs may be communicated to the UE, which may be used by the UE in HF page monitoring, HF beam alignment and HF connection setup. In a different embodiment, the prediction of the HF SNs in UE's proximity may be performed inside a CN, and the CN may then send the information about the predicted HF SNs to the MN. In another embodiment, the prediction of the HF SNs may also be performed by the UE (e.g., together with radio-based cell reselection or selection). In another embodiment, the prediction of the HF SNs may also be performed in a combined manner as discussed herein. For example, the network-side prediction may be performed based on UE-side information, such as UE-side reports about the RF measurements, or UE's mobility velocity or future direction, which may be used to match the network-side RF finger-prints or geo-database of the surrounding HF SNs, or to predict the HF SNs along the future trajectory of the UE movement.

As discussed above, the embodiments above employ the policy of "MN or LF-first, and hierarchically SN or HF-second" in various operations (such as paging or scanning) at a communication device (such as a UE, a MN or a SN). According to the policy, a wide-beam (i.e., LF) paging may be used whenever possible to enable a more efficient paging or connection setup than the standalone beam-sweeping based (i.e., HF) paging. This may help achieve at least fast HF connection setup in a LF and HF DC capable system. In one embodiment, the policy specifies an absolute priority hierarchy, i.e., LF has higher priority than HF, and may be used to enable a new hierarchical paging, scanning, or cell (re)selection scheme applicable in NR LF+NR HF (or LTE+NR HF) DC based scenarios, where a first-level coarse LF layer paging may be performed, and then a second-level finer-granularity HF layer paging may be performed under LF's assistance. This may help speed up the whole paging process to set up a HF connection.

In some embodiments, paging or scanning, and cell (re)selection may be performed in HFs and LFs in the following order: consider first LF PLMN, then LF RAT, then LF carriers, wherein this ordered process may be based on configuration and stored information, or by default, then consider LF controlled HF carriers, then HF RAT, and then HF PLMN. As an illustrative example, when paging a UE, the LFs may be used first, and then HFs may be used thereafter, if needed. When LF paging the UE, a PLMN LF may firstly be used, a RAT LF is used secondly, and then a carrier LF is used thirdly. When HF paging the UE, the HF carriers under the control of the LF carriers are used firstly, then a RAT HF is used secondly, and then a PLMN HF is used lastly.

The non-access stratum (NAS) may be used to control the PLMN(s) or RAT(s) selection, in which the cell (re)selection may be further performed, e.g., by indicating specific RAT(s) associated with a selected PLMN, and by maintaining a list of forbidden registration area(s) and a list of equivalent PLMNs. Within a specified RAT(s) or PLMN, a UE may select a suitable cell based on RRC_Idle state measurements and cell selection criteria.

A UE and the network may coordinate configuration, signaling, and execution of the policy in various operations (i.e., a policy enabled hierarchical scheme), e.g., in a specific RAT. Each one of LF MNs in a TA may page a UE by following the policy at the network-side (e.g., given the policy of LF-HF absolute prioritization). Each MN, even if it is of dual band (e.g., LF+HF), may always try to page the UE using LF first. Whether LF assisted HF paging may be needed or performed may be signaled by a CN to a LF MN, or by a LF MN to HF nodes or SNs.

An inactive or idle UE may adopt a UE-side policy of LF-HF prioritization to consider a prioritized list of page monitoring sequence, e.g., LF pages are always monitored first before HF pages. A UE may perform HF RACH under LF assistance during initial access. The UE may always scan LF first for synchronization sequences and paging messages before it tries a HF channel. The UE may always scan a list of prioritized or ordered HF SNs that is received from the MN's signaling for HF synchronization and paging. The UE may page respond to or send RACH to the list of SNs who followed the MN's instructions to page the UE and reserved RACH resources, or who page the UE when UE's mobility makes it very difficult to conduct a quick or accurate HF beam alignment to any specific SN.

In LTE, when a UE transitions from RRC_Connected to RRC_Idle, an eNB directs the UE towards a specific RF carrier by including "redirected carrier information" within the RRC_Connection_Release, and the UE follows the configuration to do cell selection or reselection. Then the UE camps on the selected cell (or carrier), and starts monitoring the cell and its paging. The UE does cell selection based on stored cell selection information (e.g., during UE-based Idle mode mobility). If nothing is specified, the UE camps on the originally connected cell or carrier, and is free to do any RF monitoring and cell selection.

In one embodiment, the UE may always set LF with a higher priority than HF, regardless of the RAT that is used, in the "redirected carrier information" in the RRC_Connection_Release before UE goes to the RRC_Idle state. If nothing is set in the RRC_Connection_Release, the UE may apply the policy of "MN or LF-first, and hierarchically SN or HF-second" as a default policy. the UE may always initiate its accesses to the network through LF first, or always camps on LF and starts monitoring paging on LF for at least a specified period of time, e.g., T_LF before it tries any HF channels. If nothing is heard during the specified period of time (>=T_LF), the UE may start searching or monitoring HF for initial access or cell (re)selection.

An MN may predict (or select or determine) and notify a list of HF SNs, particularly when HF paging is needed and HF cells are extension to the MN's LF cell, or when HF connection setup is needed. The MN may instruct each of the list of HF SNs for HF paging or HF connection setup, as discussed previously with respect to LF assisted HF paging.

The MN may predict the list of HF SNs (which will be a small group of SNs, or a narrowed-down list of SNs) that are in signal or geographical proximity of the UE based on network-side or UE-side information, such as SN geo-location information, RF-database, UE-reported RF fingerprint or location information. The UE may report, to the MN through LF, its GNSS or any A-GPS based (e.g., triangular) location assistance information (e.g., using any applicable orthogonal approach). The MN may also track a moving UE's location and time information (e.g., by Fine-Time-Assistance) based on the UE's PRACH preambles or any other signal (e.g., a Positioning RS). The MN may signal to the UE the narrowed-down list of SNs, rather than a list of all SNs in a TA or RNA of the UE. This reduces signaling overhead inside the CN and at a RAN, and avoids activating too many SNs. It is noted that similar "prediction, etc." may be performed at the UE side, e.g., based on network-signaled HF SN information and UE's own channel or geo-positioning information.

The prediction of the list of SNs may be viewed as grouping HF paging base stations in the UE's proximity. The grouping may be done by MN- or CN-based prediction, based on UE-reports, geo-position information, RF fingerprint database information, or UE's channel information. It is noted that Option 2 and Option 3 discussed previously for NR paging operations use paging groups. A paging group refers to grouping of UEs, instead of selection of a group of HF stations (i.e., SNs) in the hierarchical paging scheme.

In some embodiment, each of the LF master gNBs (MgNBs) in a tracking area (TA) can page a UE by following a network-side policy defined herein. In particular, each MgNB, even if it is a dual band MgNB (LF+HF), tries to page the UE using LF first. The MgNB may notify the remote HF secondary gNBs (SgNBs) to do so also, if the SgNBs are extensions to the LF coverage of the MgNB. The MgNB may map a core network (CN) message to an S1-message/next generation control plane (NG-C) message, and the MgNB may then forward the message to a small group of HF SgNBs under its LF coverage to page the UE. Such behavior may be contrasted with a case where the MgNB forwards the message to all the SgNBs within a TA or Radio Access Network (RAN) Notification Area (RNA), if there is no MgNB assistance.

The MgNB may predict the list of HF SgNBs based on a network-side geo-database and UE-reported location information, in order to reduce the network-side page signaling overhead. The UE may report to the MgNB through LF the UE's Global Navigation Satellite System (GNSS) or any Assisted Global Positioning System (A-GPS) based (triangular) location assistance information. Alternatively, the MgNB may track a moving UE's location and time information (e.g., by Fine-Time-Assistance) based on the UE's Physical Random Access Channel (PRACH) preambles or any other signal (such as a positioning reference signal). The MgNB may signal to the UE the narrowed-down list of SgNBs that are in signal or geographical proximity of the UE. By doing so, the MgNB may greatly reduce overhead.

In an embodiment, the UE may respond to a small group of potential SgNBs that are following the MgNB's instructions to page the UE, if the UE heard multiple SgNBs but the UE's mobility makes it difficult to quickly and accurately align and respond to any specific SgNB. In an embodiment, an inactive or idle UE may also consider a prioritized list of page monitoring sequences. For example, LF paging may be tried first ahead of HF paging. In such a case, the UE may scan the LF signals first for synchronization sequences and paging messages before the UE tries the HF signals. The UE may scan a prioritized list of SgNBs in the MgNB's signaling for HF synchronization and paging.

The policy of absolute priority of LF-higher-than-HF may be adopted during cell (re)selection in a hierarchical paging, scan, or cell (re)selection scheme in NR LF+NR HF (or LTE+NR HF) DC scenarios. Compared to conventional DC paging schemes, or SA HF paging schemes, in the embodiments of the present disclosure, the first-level LF paging may roughly locate a UE in a specific LF MN coverage, and narrow down a list of HF SNs that are needed for second-level HF paging. The second-level HF layer paging receives LF's assistance information, achieves finer-grained UE positioning, and sets up a high-speed HF connection with the HF SNs involved. The embodiment two-level paging reduces overall signaling overhead, latency, and power consumption.

In some embodiments, the policy may also be configured to be a policy of "LF first, then HF but only if necessary, and if so assisted by LF", where paging is first performed in LF, and if HF paging is needed, LF-assisted HF paging may be performed thereafter. The policy may be applied to a specific PLMN, RAT, frequency carrier, or across multiple PLMNs, RATs, and/or frequency carriers.

In the case of CN-based paging, the policy means that "CN pings specific MN first, and then SN if necessary, and if so only a small group of predicted SN" inside the network is involved in paging. That is, a CN sends a page to a MN, the MN instructs a list of predicted SNs (which is a small group of SNs in the network) for HF paging.

Configuration and execution of the policy may help enhance the LF-assisted-HF-paging scheme, e.g., reducing paging misses of a mobile UE. The predicted set of HF SNs conducting second-level paging is in a UE's proximity, which reduces HF paging overhead. The set of predicted HF SNs may include less number of HF SNs than all HF SNs that under the LF coverage or in the UE's TA area, thus reducing the overhead of involving more or all HF SNs. The set of predicted HF SNs may include HF SNs than those involved in the LF-assisted-HF-paging scheme, thus providing higher mobility robustness. The embodiments enable multi-SN paging from a smaller group of HF SNs under a MN's LF coverage or control, and reduce paging misses and increases robustness compared with a single SN group, because a group paging is still relying on only one representative SN from the group to conduct paging, which is generally associated with smaller coverage than a multi-SN paging.

FIG. 13 illustrates a diagram of an embodiment method 1300 for wireless communications. The method 1300 may be performed by a network device, such as a base station. As shown, at step 1302, the network device pages a user equipment (UE) using a first frequency in a first set of frequencies according to a policy, where the policy requires that paging be performed in the first set of frequencies before being performed in a second set of frequencies different than the first set of frequencies.

FIG. 14 illustrates a diagram of an embodiment method 1400 for wireless communications. The method 1400 may be performed by a user device, such as a UE. As shown, at step 1402, the UE performs, in a first set of frequencies according to a policy, an operation including paging, page monitoring, cell selection triggered by paging, or cell reselection triggered by paging, where the policy requires that the operation be performed in the first set of frequencies before being performed in a second set of frequencies different than the first set of frequencies.

FIG. 15 illustrates a diagram of an embodiment method 1500 for wireless communications. The method 1500 may be performed by a network device, such as a base station. As shown, at step 1502, the network device pages a user equipment (UE) over a first paging channel over a first set of channels according to a policy, where the policy requires that paging be performed over the first set of channels before being performed over a second set of channels different than the first set of channels FIG. 16 illustrates a diagram of an embodiment method 1600 for wireless communications. The method 1600 may be performed by a user device, such as a UE. As shown, at step 1602, the UE performs, over a first set of channels according to a policy, an operation comprising paging, page monitoring, cell selection triggered by paging, or cell reselection triggered by paging, where the policy requires that the operation be performed over the first set of channels before being performed over a second set of channels different than the first set of frequencies.

In accordance with an embodiment of the present disclosure, a method for paging comprises transmitting, by a network device (for example, a TRP, a base station, a CU of a base station, or a paging device in the core network) using a primary communication channel, to a UE using a secondary communication channel, information associated with paging operations over the secondary communication channel, wherein the ordered paging procedure and the difference between the primary and the secondary channel is defined in a policy that is hardcoded or network configured.

In accordance with another embodiment of the present disclosure, a method for paging comprises transmitting, by a UE, before a downlink synchronization with a network device, a beamformed uplink page using a (FDD-paired or TDD) communication channel of different (uplink or downlink) directions, wherein the ordered procedure of uplink paging ahead of the downlink synchronization is defined by a policy wherein that is configured over a different channel than the one used for the paging or synchronization.

In accordance with another embodiment of the present disclosure, a method for paging a UE comprises transmitting a page to the UE at a first frequency by a master network device and transmitting another page at a second frequency by a secondary network device, while the network devices receive a page response at the respective frequency from the same UE.

According to one aspect of the present disclosure, a method is provided that includes: paging, by a network device, a user equipment (UE) using a first frequency in a first set of frequencies according to a policy, the policy requiring that paging be performed in the first set of frequencies before being performed in a second set of frequencies different than the first set of frequencies.

Optionally, in any of the preceding aspects, the first set of frequencies is lower than the second set of frequencies.

Optionally, in any of the preceding aspects, wireless communications using the first set of frequencies does not require beamforming, and wireless communications using the second set of frequencies requires beamforming.

Optionally, in any of the preceding aspects, the first set of frequencies corresponds to beam widths that are wider than those of the second set of frequencies.

Optionally, in any of the preceding aspects, the first set of frequencies is used by a master node (MN), and the second set of frequencies is used by one or more secondary nodes (SNs) that are associated with the MN.

Optionally, in any of the preceding aspects, one of the first set of frequencies and the second set of frequencies is in an unlicensed frequency band, and the other one of the first set of frequencies and the second set of frequencies is in a licensed frequency band.

Optionally, in any of the preceding aspects, the first set of frequencies has better channel quality than the second set of frequencies.

Optionally, in any of the preceding aspects, the first set of frequencies is associated with higher transmission power than the second set of frequencies.

Optionally, in any of the preceding aspects, transmission using the first set of frequencies provides greater coverage than the second set of frequencies.

Optionally, in any of the preceding aspects, the first set of frequencies corresponds to channels that are less loaded than the second set of frequencies.

Optionally, in any of the preceding aspects, the network device is a base station.

Optionally, in any of the preceding aspects, the network device is a master node.

Optionally, in any of the preceding aspects, the network device is a secondary node.

Optionally, in any of the preceding aspects, the network device is a part of a core network.

Optionally, in any of the preceding aspects, the method further comprises: determining, by the network device, a plurality of network devices that are configured to operate in the second set of frequencies; and instructing, by the network device, at least one of the plurality of network devices to page the UE using a frequency in the second set of frequencies according to the policy.

Optionally, in any of the preceding aspects, the method further comprises transmitting, by the network device to the UE, information about the at least one of the plurality of network devices.

Optionally, in any of the preceding aspects, the information comprises location information, beam information, paging opportunity information, or synchronization information of the at least one of the plurality of network devices.

Optionally, in any of the preceding aspects, the method further comprises: transmitting, by the network device to the at least one of the plurality of network devices, information about the UE.

Optionally, in any of the preceding aspects, determining, by the network device, the plurality of network devices comprises: determining, by the network device, the plurality of network devices based on a location, beam information, a channel quality measurement report or transmission power information of the UE.

Optionally, in any of the preceding aspects, the method further comprises: re-determining, by the network device, one of the plurality of network devices.

Optionally, in any of the preceding aspects, one of the plurality of network devices is re-determined based on a measurement report from the UE or network loading information.

Optionally, in any of the preceding aspects, the method further comprises: transmitting, by the network node, a secondary node addition request to the at least one of the plurality of network devices.

Optionally, in any of the preceding aspects, the method further comprises: receiving, by the network node, a secondary node addition acknowledgement from the at least one of the plurality of network devices.

Optionally, in any of the preceding aspects, the method further comprises: receiving, by the network device, a paging response from the UE at the first frequency.

Optionally, in any of the preceding aspects, the method further comprises: receiving, by the network device, a paging response from one of the plurality of network devices operating in a second frequency of the second set of frequencies, the one of the plurality of network devices having received a paging response from the UE.

Optionally, in any of the preceding aspects, the method further comprises: paging, by the network device, the UE using a second frequency in the second set of frequencies after paging the UE using the first frequency.

Optionally, in any of the preceding aspects, the method further comprises: establishing, by the network device, a communication connection with the UE at the first frequency.

Optionally, in any of the preceding aspects, the method further comprises: receiving, by the network device, information of the policy from a core network device.

Optionally, in any of the preceding aspects, the method further comprises: receiving, by the network device, update information of the policy.

Optionally, in any of the preceding aspects, the policy is hardcoded at the network device, pre-configured with the network device, or dynamically configured with the network device using signaling messages.

According to another aspect of the present disclosure, a method is provided that includes: performing, by user equipment (UE) in a first set of frequencies according to a policy, an operation comprising paging, page monitoring, cell selection triggered by paging, or cell reselection triggered by paging, the policy requiring that the operation be performed in the first set of frequencies before being performed in a second set of frequencies different than the first set of frequencies.

Optionally, in any of the preceding aspects, the first set of frequencies is lower than the second set of frequencies.

Optionally, in any of the preceding aspects, the first set of frequencies is associated with higher transmission power than the second set of frequencies.

Optionally, in any of the preceding aspects, transmission using the first set of frequencies provides greater coverage than the second set of frequencies.

Optionally, in any of the preceding aspects, wireless communications using the first set of frequencies does not require beamforming, and wireless communications using the second set of frequencies requires beamforming.

Optionally, in any of the preceding aspects, the first set of frequencies corresponds to beam widths that are wider than those of the second set of frequencies.

Optionally, in any of the preceding aspects, the first set of frequencies is used by a master node (MN), and the second set of frequencies is used by one or more secondary nodes (SNs) of the MN.

Optionally, in any of the preceding aspects, one of the first set of frequencies and the second set of frequencies is in an unlicensed frequency band, and the other one of the first set of frequencies and the second set of frequencies is in a licensed frequency band.

Optionally, in any of the preceding aspects, the first set of frequencies has better channel quality than the second set of frequencies.

Optionally, in any of the preceding aspects, the first set of frequencies corresponds to channels that are less loaded than the second set of frequencies.

Optionally, in any of the preceding aspects, the method further comprises: performing, by the UE, the operation in the second set of frequencies after performing the operation in the first set of frequencies according to the policy.

Optionally, in any of the preceding aspects, performing the operation in the first set of frequencies comprises: monitoring, by the UE, a page at a first frequency of the first set of frequencies.

Optionally, in any of the preceding aspects, the method further comprises: monitoring, by the UE, a page at a second frequency of the second set of frequencies after monitoring the page at the first frequency according to the policy.

Optionally, in any of the preceding aspects, monitoring the page at the second frequency comprises: monitoring, by the UE, pages from a plurality of network devices, the plurality of network devices operable in the second set of frequencies.

Optionally, in any of the preceding aspects, performing the operation in the first set of frequencies comprises: scanning, by the UE after being paged, channels in the first set of frequencies during a cell selection or cell reselection process.

Optionally, in any of the preceding aspects, the method further comprises: scanning, by the UE, channels in the second set of frequencies during the cell selection process or cell reselection process after scanning the channels in the first set of frequencies.

Optionally, in any of the preceding aspects, scanning the channels in the second set of frequencies comprises: scanning, by the UE, channels extending between the UE and a plurality of network devices, the plurality of network devices operable in the second set of frequencies.

Optionally, in any of the preceding aspects, the plurality of network devices is determined based on a location, beam information, a channel quality measurement report, or transmission power information of the UE.

Optionally, in any of the preceding aspects, the method further comprises: receiving, by the UE, information about the plurality of network devices.

Optionally, in any of the preceding aspects, the method further comprises: establishing, by the UE, a communication connection with a network device at a second frequency in the second set of frequencies.

Optionally, in any of the preceding aspects, the method further comprises: receiving, by the UE, information about the policy.

Optionally, in any of the preceding aspects, the method further comprises: receiving, by the UE, updated information about the policy.

Optionally, in any of the preceding aspects, the UE is in a RRC_Idle state.

Optionally, in any of the preceding aspects, the UE is in a RRC_Inactive state.

Optionally, in any of the preceding aspects, the policy is hardcoded at the UE, pre-configured with the UE, or dynamically configured with the UE using signaling messages.

According to another aspect of the present disclosure, a method is provided that includes: paging, by a network device, a user equipment (UE) over a first paging channel over a first set of channels according to a policy, the policy requiring that paging be performed over the first set of channels before being performed over a second set of channels different than the first set of channels.

Optionally, in any of the preceding aspects, the first set of channels is associated with a master node and the second set of channels is associated with a secondary node, the secondary node being associated with the master node.

Optionally, in any of the preceding aspects, the first set of channels is associated with frequencies lower than frequencies associated with the second set of channels.

Optionally, in any of the preceding aspects, wireless communications over the first set of channels does not require beamforming, and wireless communications using the second set of channels requires beamforming.

Optionally, in any of the preceding aspects, the first set of channels corresponds to beam widths that are wider than those of the second set of channels.

Optionally, in any of the preceding aspects, one of the first set of channels and the second set of channels is associated with frequencies in an unlicensed frequency band, and the other one of the first set of channels and the second set of channels is associated with frequencies in a licensed frequency band.

Optionally, in any of the preceding aspects, the first set of channels has better channel quality than the second set of channels.

Optionally, in any of the preceding aspects, the first set of channels is associated with higher transmission power than the second set of channels.

Optionally, in any of the preceding aspects, transmission over the first set of channels provides greater coverage than the second set of channels.

Optionally, in any of the preceding aspects, the first set of channels experience less load than the second set of channels.

Optionally, in any of the preceding aspects, the method further comprises: determining, by the network device, a plurality of network devices that are configured to communicate over the second set of channels; and instructing, by the network device, at least one of the plurality of network devices to page the UE over a channel in the second set of channels according to the policy.

Optionally, in any of the preceding aspects, the method further comprises: transmitting, by the network device to the UE, information about the at least one of the plurality of network devices.

Optionally, in any of the preceding aspects, the information comprises location information, beam information, paging opportunity information, or synchronization information of the at least one of the plurality of network devices.

Optionally, in any of the preceding aspects, the method further comprises: transmitting, by the network device to the at least one of the plurality of network devices, information about the UE.

Optionally, in any of the preceding aspects, determining, by the network device, the plurality of network devices comprises: determining, by the network device, the plurality of network devices based on a location, beam information, a channel quality measurement report or transmission power information of the UE.

Optionally, in any of the preceding aspects, the method further comprises: re-determining, by the network device, one of the plurality of network devices.

Optionally, in any of the preceding aspects, the one of the plurality of network devices is re-determined based on a measurement report from the UE or network loading information.

Optionally, in any of the preceding aspects, the method further comprises: transmitting, by the network node, a secondary node addition request to the at least one of the plurality of network devices.

Optionally, in any of the preceding aspects, the method further comprises: receiving, by the network device, a paging response from one of the plurality of network devices operating over a second channel of the second set of channels, the one of the plurality of network devices having received a paging response from the UE.

Optionally, in any of the preceding aspects, the method further comprises: paging, by the network device, the UE over a second channel in the second set of channels after paging the UE over the first channel.

Optionally, in any of the preceding aspects, the method further comprises: receiving, by the network device, information of the policy from a core network device.

Optionally, in any of the preceding aspects, the policy is hardcoded at the network device, pre-configured with the network device, or dynamically configured with the network device using signaling messages.

According to another aspect of the present disclosure, a method is provided that includes: performing, by user equipment (UE) over a first set of channels according to a policy, an operation comprising paging, page monitoring, cell selection triggered by paging, or cell reselection triggered by paging, the policy requiring that the operation be performed over the first set of channels before being performed over a second set of channels different than the first set of frequencies.

Optionally, in any of the preceding aspects, the first set of channels is associated with frequencies lower than that associated with the second set of channels.

Optionally, in any of the preceding aspects, the first set of channels is associated with higher transmission power than the second set of channels.

Optionally, in any of the preceding aspects, transmission over the first set of channels provides greater coverage than the second set of channels.

Optionally, in any of the preceding aspects, wireless communications over the first set of channels does not require beamforming, and wireless communications using the second set of channels requires beamforming.

Optionally, in any of the preceding aspects, the first set of channels corresponds to beam widths that are wider than those of the second set of channels.

Optionally, in any of the preceding aspects, the first set of channels is associated with a master node and the second set of channels is associated with a secondary node, the secondary node being associated with the master node.

Optionally, in any of the preceding aspects, one of the first set of channels and the second set of channels is associated with frequencies in an unlicensed frequency band, and the other one of the first set of channels and the second set of channels is associated with frequencies in a licensed frequency band.

Optionally, in any of the preceding aspects, the first set of channels has better channel quality than the second set of channels.

Optionally, in any of the preceding aspects, the first set of channels experience less load than the second set of channels.

Optionally, in any of the preceding aspects, the method further comprises: performing, by the UE, the operation over the second set of channels after performing the operation over the first set of channels according to the policy.

Optionally, in any of the preceding aspects, performing the operation over the first set of channels comprises: monitoring, by the UE, a page at one or more first frequencies associated with the first set of channels.

Optionally, in any of the preceding aspects, the method further comprises: monitoring, by the UE, a page at one or more second frequencies associated with the second set of channels after monitoring the page at the one or more first frequencies according to the policy.

Optionally, in any of the preceding aspects, monitoring the page at the one or more second frequencies comprises: monitoring, by the UE, pages from a plurality of network devices, the plurality of network devices operable in the one or more second frequencies associated with the second set of channels.

Optionally, in any of the preceding aspects, performing the operation over the first set of channels comprises: scanning, by the UE after being paged, a first channel of the first set of channels during a cell selection or cell reselection process.

Optionally, in any of the preceding aspects, the method further comprises: scanning, by the UE, a second channel of the second set of channels during the cell selection process or cell reselection process after scanning the first channel of the first set of channels.

Optionally, in any of the preceding aspects, scanning the second channel in the second set of channels comprises: scanning, by the UE, the second channel extending between the UE and a plurality of network devices, the plurality of network devices operable in the second channel.

Optionally, in any of the preceding aspects, the plurality of network devices is determined based on a location, beam information, a channel quality measurement report, or transmission power information of the UE.

Optionally, in any of the preceding aspects, the method further comprises: receiving, by the UE, information about the plurality of network devices.

Optionally, in any of the preceding aspects, the method further comprises: establishing, by the UE, a communication connection with a network device over a channel of the second set of channels.

Optionally, in any of the preceding aspects, the method further comprises: receiving, by the UE, information about the policy.

Optionally, in any of the preceding aspects, the method further comprises: receiving, by the UE, updated information about the policy.

Optionally, in any of the preceding aspects, the UE is in a RRC_Idle state.

Optionally, in any of the preceding aspects, the UE is in a RRC_Inactive state.

Optionally, in any of the preceding aspects, the policy is hardcoded at the UE, pre-configured with the UE, or dynamically configured with the UE using signaling messages.

According to another aspect of the present disclosure, an apparatus is provided that includes a non-transitory memory storage comprising instructions, and one or more processors in communication with the memory storage, wherein the one or more processors executes the instructions to: perform a method as recited in any of the preceding aspects.

According to another aspect of the present disclosure, a communications system comprising a network device, and a user equipment (UE), wherein the network device is configured to perform a method as recited in any of the preceding aspects in connection with a network device, and the UE is configured to perform a method as recited in any of the preceding aspects in connection with a UE.

Figure 17:
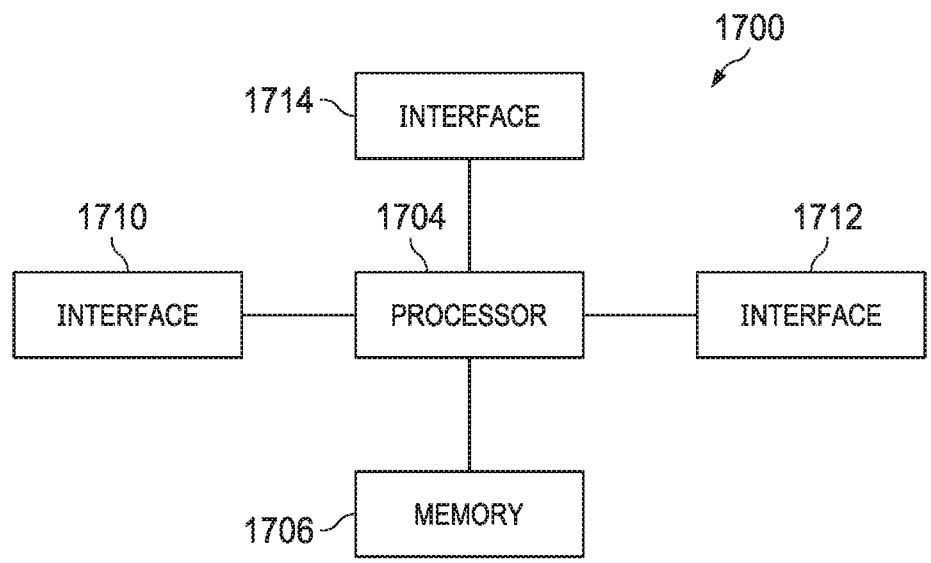
FIG. 17 illustrates a diagram of an embodiment processing system.

FIG. 17 illustrates a block diagram of an embodiment processing system 1700 for performing methods described herein, which may be installed in a host device. As shown, the processing system 1700 includes a processor 1704, a memory 1706, and interfaces 1710-1714, which may (or may not) be arranged as shown in FIG. 17. The processor 1704 may be any component or collection of components adapted to perform computations and/or other processing related tasks, and the memory 1706 may be any component or collection of components adapted to store programming and/or instructions for execution by the processor 1704. In an embodiment, the memory 1706 includes a non-transitory computer readable medium. The interfaces 1710, 1712, 1714 may be any component or collection of components that allow the processing system 1700 to communicate with other devices/components and/or a user. For example, one or more of the interfaces 1710, 1712, 1714 may be adapted to communicate data, control, or management messages from the processor 1704 to applications installed on the host device and/or a remote device. As another example, one or more of the interfaces 1710, 1712, 1714 may be adapted to allow a user or user device (e.g., personal computer (PC), etc.) to interact/communicate with the processing system 1700. The processing system 1700 may include additional components not depicted in FIG. 17, such as long term storage (e.g., non-volatile memory, etc.).

In some embodiments, the processing system 1700 is included in a network device that is accessing, or part otherwise of, a telecommunications network. In one example, the processing system 1700 is in a network-side device in a wireless or wireline telecommunications network, such as a base station, a relay station, a scheduler, a controller, a gateway, a router, an applications server, or any other device in the telecommunications network. In other embodiments, the processing system 1700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 18:
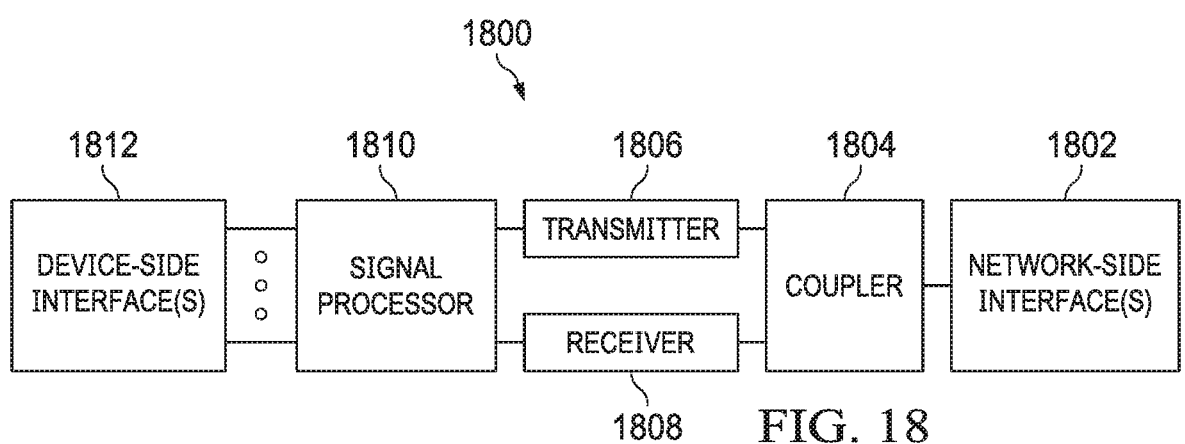
FIG. 18 illustrates a diagram of an embodiment transceiver.

In some embodiments, one or more of the interfaces 1710, 1712, 1714 connects the processing system 1700 to a transceiver adapted to transmit and receive signaling over the telecommunications network. FIG. 18 illustrates a block diagram of a transceiver 1800 adapted to transmit and receive signaling over a telecommunications network. The transceiver 1800 may be installed in a host device. As shown, the transceiver 1800 comprises a network-side interface 1802, a coupler 1804, a transmitter 1806, a receiver 1808, a signal processor 1810, and a device-side interface 1812. The network-side interface 1802 may include any component or collection of components adapted to transmit or receive signaling over a wireless or wireline telecommunications network. The coupler 1804 may include any component or collection of components adapted to facilitate bi-directional communication over the network-side interface 1802. The transmitter 1806 may include any component or collection of components (e.g., up-converter, power amplifier, etc.) adapted to convert a baseband signal into a modulated carrier signal suitable for transmission over the network-side interface 1802. The receiver 1808 may include any component or collection of components (e.g., down-converter, low noise amplifier, etc.) adapted to convert a carrier signal received over the network-side interface 1802 into a baseband signal. The signal processor 1810 may include any component or collection of components adapted to convert a baseband signal into a data signal suitable for communication over the device-side interface(s) 1812, or vice-versa. The device-side interface(s) 1812 may include any component or collection of components adapted to communicate data-signals between the signal processor 1810 and components within the host device (e.g., the processing system 1700, local area network (LAN) ports, etc.).

The transceiver 1800 may transmit and receive signaling over any type of communications medium. In some embodiments, the transceiver 1800 transmits and receives signaling over a wireless medium. For example, the transceiver 1800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1802 comprises one or more antenna/radiating elements. For example, the network-side interface 1802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a paging unit/module, a determining unit/module, a beamforming unit/module, a cell section unit/module, a cell reselection unit/module, a page monitoring unit/module, a prioritizing unit/module, a page responding unit/module, an instructing unit/module, a predicting unit/module, a selecting unit/module, an acknowledging unit/module, a connection establishing unit/module, a performing unit/module, and/or a scanning unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:

obtaining, by a master node (MN) serving a user equipment (UE), a configuration specifying to page the UE in a first set of frequencies before paging the UE in a second set of frequencies higher than the first set of frequencies;

upon determining there is a need to page the UE, sending, by the MN according to the configuration, a paging message to the UE using a first frequency in the first set of frequencies to page the UE, the paging message comprising information of one or more secondary nodes (SNs) operable in the second set of frequencies that are to page the UE, wherein the information of the one or more SNs comprises location information of the one or more SNs, beam direction information of the one or more SNs, synchronization information of the one or more SNs for synchronizing with the one or more SNs, or paging information of the one or more SNs, the paging information of the one or more SNs further comprising a transmit receive point (TRP) ID, a scrambling code, a paging schedule, a paging resource, a beam ID or a beam direction;

selecting, by the MN based on location information of the UE and the information of the one or more SNs, at least one SN from the one or more SNs to page the UE;

instructing, by the MN after sending the paging message, the at least one SN to page the UE using the second set of frequencies; and receiving, by the MN from a first secondary node of the at least one SN, a page response of the UE in response to paging the UE; and wherein the method further comprises:
determining, by the MN, the one or more SNs based on information of the UE, wherein the information of the UE comprises information of a location of the UE, a paging frame, a paging occasion, a discontinuous reception (DRX) cycle, an uplink beam direction, a resource of a random access channel (RACH), or a resource for area update (AU); and wherein instructing, by the MN, the at least one SN to page the UE comprises:
sending, by the MN, a SN addition request to a node of the one or more SNs, notifying that the node is added as a secondary node for paging the UE; and
receiving, by the MN, a SN addition acknowledgement message from the node.

2. The method of claim 1, further comprising:
sending, by the MN, the information of the UE to the one or more SNs for paging the UE in the second set of frequencies.

3. The method of claim 1, further comprising:
receiving, by the MN from the UE, a report of measurement on the one or more SNs;
updating, by the MN, the one or more SNs for the UEs based on the report; and
sending, by the MN to the UE, the updated one or more SNs.

4. The method of claim 1, wherein instructing, by the MN, the at least one SN to page the UE comprises:
requesting, by the MN, a node of the one or more SNs to allocate a resource for paging the UE in the second set of frequencies.

5. The method of claim 1, wherein the UE is in an idle or inactive state.

6. The method of claim 1, further comprising:
receiving, by the MN, a paging response from the UE in the first frequency.

7. A method comprising:
obtaining, by a user equipment (UE), a configuration specifying to monitor pages in a first set of frequencies before monitoring pages in a second set of frequencies higher than the first set of frequencies;

monitoring, by the UE when entering a low-power mode, a first paging message in a first frequency of the first set of frequencies according to the configuration, and receiving, by the UE in the first frequency from a master node (MN), the first paging message comprising information of one or more secondary nodes (SNs) that are operable in the second set of frequencies and that are to page the UE in the second set of frequencies, wherein the one or more SNs are determined based on information of the UE, the information of the UE comprising information of a location of the UE, a paging frame, a paging occasion, a discontinuous reception (DRX) cycle, an uplink beam direction, a resource of a random access channel (RACH), or a resource for area update (AU); and monitoring, by the UE after receiving the first paging message, a second paging message in the second set of frequencies according to the information of the one or more SNs, and receiving the second paging message from at least one SN of the one or more SNs, wherein the at least one SN is selected by the MN based on location information of the UE and the information of the one or more SNs, and the at least one SN is instructed to page the UE by the MN with a SN addition request and a SN addition acknowledgement message exchanged between the at least one SN and the MN; and wherein the information of the one or more SNs comprises location information of the one or more SNs, beam direction information of the one or more SNs, synchronization information of the one or more SNs for synchronizing with the one or more SNs, or paging information of the one or more SNs, the paging information further comprising a transmit receive point (TRP) ID, a scrambling code, a paging schedule, a paging resource, a beam ID or a beam direction.

8. The method of claim 7, further comprising:
receiving, by the UE, one or more paging messages from the one or more SNs in the second set of frequencies.

9. The method of claim 8, further comprising:
sending, by the UE, a paging response to a secondary node of the one or more SNs in a second frequency of the second set of frequencies in response to receiving the one or more paging messages.

10. The method of claim 8, further comprising:
sending, by the UE, a random access preamble to a secondary node of the one or more SNs in a second frequency of the second set of frequencies in response to receiving the one or more paging messages.

11. The method of claim 8, further comprising:
scanning, by the UE, channels in the second set of frequencies in a cell selection or cell reselection process; and
selecting, by the UE, a secondary node from the one or more SNs as a serving node of the UE based on scanning the channels.

12. The method of claim 7, further comprising:
sending, by the UE to the MN, the information of the UE.

13. The method of claim 7, wherein the UE is in an idle or inactive state.

14. An apparatus comprising:
a non-transitory memory storage comprising instructions; and one or more processors in communication with the memory storage, wherein the one or more processors executes the instructions to cause the apparatus to perform:
obtaining, by the apparatus as a master node (MN) serving a user equipment (UE), a configuration specifying to page the UE in a first set of frequencies before paging the UE in a second set of frequencies higher than the first set of frequencies;
upon determining there is a need to page the UE, sending, by the MN according to the configuration, a paging message to the UE using a first frequency in the first set of frequencies to page the UE according to the configuration, the paging message comprising information of one or more secondary nodes (SNs) operable in the second set of frequencies that are to page the UE, wherein the information of the one or more SNs comprises location information of the one or more SNs, beam direction information of the one or more SNs, synchronization information of the one or more SNs for synchronizing with the one or more SNs, or paging information of the one or more SNs, the paging information of the one or more SNs further comprising a transmit receive point (TRP) ID, a scrambling code, a paging schedule, a paging resource, a beam ID or a beam direction;
selecting, by the MN based on location information of the UE and the information of the one or more SNs, at least one SN from the one or more SNs to page the UE;
instructing, by the MN, the at least one SN to page the UE using the second set of frequencies; and
receiving, by the MN from a first secondary node of the at least one SN, a page response of the UE in response to paging the UE; and
wherein the one or more processors executes the instructions further to cause the apparatus to perform:
determining, by the MN, the one or more SNs based on information of the UE, wherein the information of the UE comprises information of a location of the UE, a paging frame, a paging occasion, a discontinuous reception (DRX) cycle, an uplink beam direction, a resource of a random access channel (RACH), or a resource for area update (AU); and
wherein instructing, by the MN, the at least one SN to page the UE comprises:
sending, by the MN, a SN addition request to a node of the one or more SNs, notifying that the node is added as a secondary node for paging the UE; and
receiving, by the MN, a SN addition acknowledgement message from the node.

* * * * *